United States Patent
Yamaguchi et al.

(10) Patent No.: US 9,772,627 B2
(45) Date of Patent: *Sep. 26, 2017

(54) SELF-POSITION CALCULATING APPARATUS AND SELF-POSITION CALCULATING METHOD

(71) Applicant: Nissan Motor Co., Ltd., Yokohama-Shi, Kanagawa (JP)

(72) Inventors: Ichiro Yamaguchi, Kanagawa (JP); Hidekazu Nishiuchi, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/118,754

(22) PCT Filed: Feb. 24, 2014

(86) PCT No.: PCT/JP2014/054316
§ 371 (c)(1),
(2) Date: Aug. 12, 2016

(87) PCT Pub. No.: WO2015/125300
PCT Pub. Date: Aug. 27, 2015

(65) Prior Publication Data
US 2017/0045889 A1    Feb. 16, 2017

(51) Int. Cl.
*G05D 1/00* (2006.01)
*G01C 1/00* (2006.01)
(Continued)

(52) U.S. Cl.
CPC .......... *G05D 1/0248* (2013.01); *G01C 11/02* (2013.01); *G01C 21/28* (2013.01); *G06F 17/11* (2013.01);
(Continued)

(58) Field of Classification Search
CPC . G05D 1/00; G01C 1/00; G01C 21/00; G01C 21/20; G06T 7/00; G06T 7/70
See application file for complete search history.

(56) References Cited

U.S. PATENT DOCUMENTS

| 2005/0163343 | A1 | 7/2005 | Kakinami et al. |
| 2013/0182906 | A1 | 7/2013 | Kojo et al. |
| 2017/0057475 | A1* | 3/2017 | Lim .......................... B60T 7/22 |

FOREIGN PATENT DOCUMENTS

| JP | H06325298 A | 11/1994 |
| JP | 2004198211 A | 7/2004 |

(Continued)

OTHER PUBLICATIONS

R. I. Hartley, "A linear method for reconstruction from lines and points," Proc. 5th International Conference on computer Vision, Cambridge, Massachusetts, pp. 882-887 (1995).

(Continued)

*Primary Examiner* — Yonel Beaulieu
(74) *Attorney, Agent, or Firm* — Young Basile Hanlon & MacFarlane, P.C.

(57) ABSTRACT

A self-position calculating apparatus includes: a light projector configured to project a patterned light beam onto a road surface around a vehicle; an image capturing unit configured to capture and obtain an image of the road surface around the vehicle covering an area of the projected patterned light beam; an orientation angle calculator configured to calculate an orientation angle of the vehicle relative to the road surface from a position of the patterned light beam on the image obtained by the image capturing unit; a feature point detector configured to detect multiple feature points on the road surface within the feature-point detection region; an orientation change amount calculator configured to calculate an amount of change in the orienta- (Continued)

tion of the vehicle; and a self-position calculator configured to calculate a current position and a current orientation angle of the vehicle.

6 Claims, 18 Drawing Sheets

(51) Int. Cl.
| | |
|---|---|
| *G06T 7/00* | (2017.01) |
| *G06T 7/70* | (2017.01) |
| *G01C 21/00* | (2006.01) |
| *G01C 21/20* | (2006.01) |
| *G05D 1/02* | (2006.01) |
| *G01C 21/28* | (2006.01) |
| *G01C 11/02* | (2006.01) |
| *G06K 9/00* | (2006.01) |
| *G06K 9/46* | (2006.01) |
| *G06T 7/73* | (2017.01) |
| *G06F 17/11* | (2006.01) |
| *G06F 17/16* | (2006.01) |

(52) U.S. Cl.
CPC ......... *G06F 17/16* (2013.01); *G06K 9/00791* (2013.01); *G06K 9/4671* (2013.01); *G06T 7/73* (2017.01); *G06K 2209/25* (2013.01); *G06T 2207/30244* (2013.01); *G06T 2207/30256* (2013.01)

(56) References Cited

FOREIGN PATENT DOCUMENTS

| | | |
|---|---|---|
| JP | 2004198212 A | 7/2004 |
| JP | 2007256090 A | 10/2007 |
| JP | 2007278951 A | 10/2007 |
| JP | 2008175717 A | 7/2008 |
| JP | 2010101683 A | 5/2010 |
| JP | 2013147114 A | 8/2013 |
| JP | 2013187862 A | 9/2013 |
| WO | 2012172870 A1 | 12/2012 |

OTHER PUBLICATIONS

D. G. Lowe, "Distinctive Image Features from Scale-Invariant Keypoints," Int. J. Comput. Vis., vol. 60, No. 2, pp. 91-110, Nov. 2004.

Yasushi Kanazawa, et al., "Detection of Feature Points for Computer Vision", IEICE Journal, Dec. 2004, pp. 1043-1048, vol. 87, No. 12.

* cited by examiner

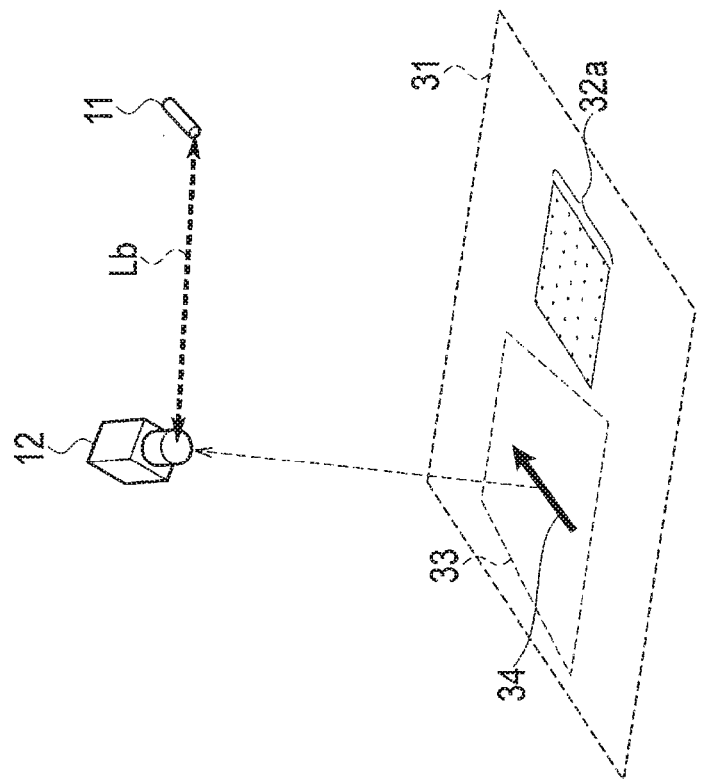
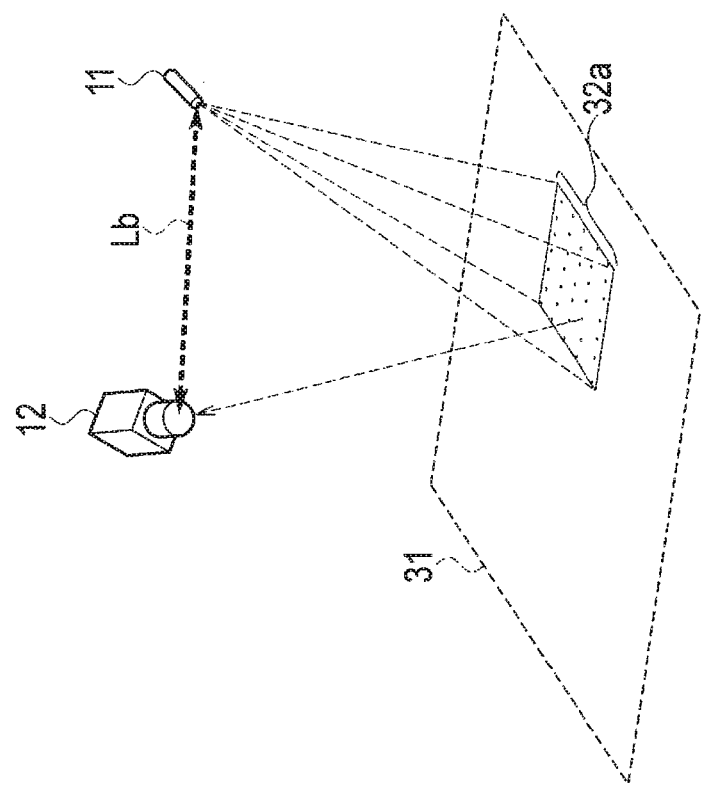

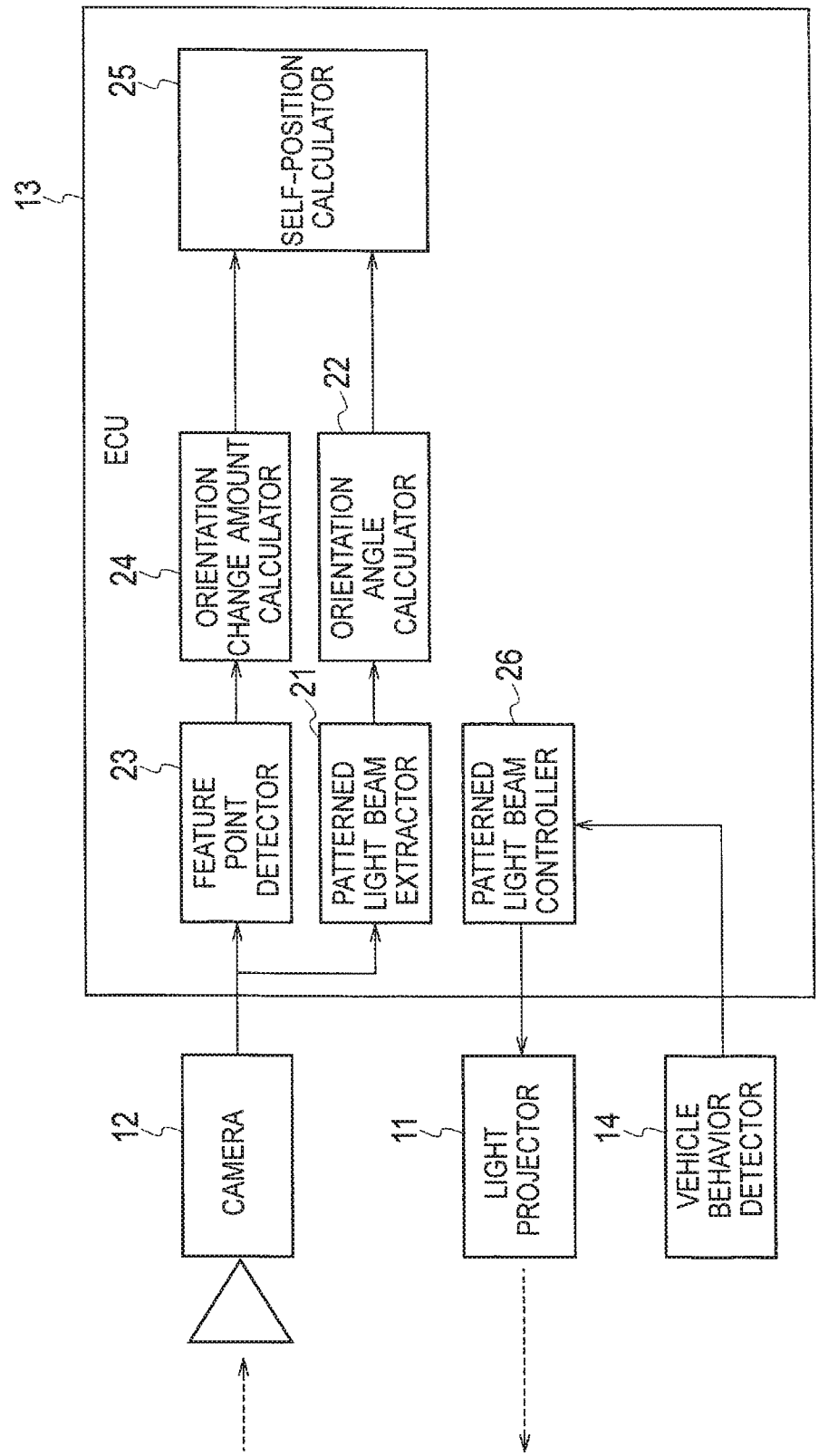

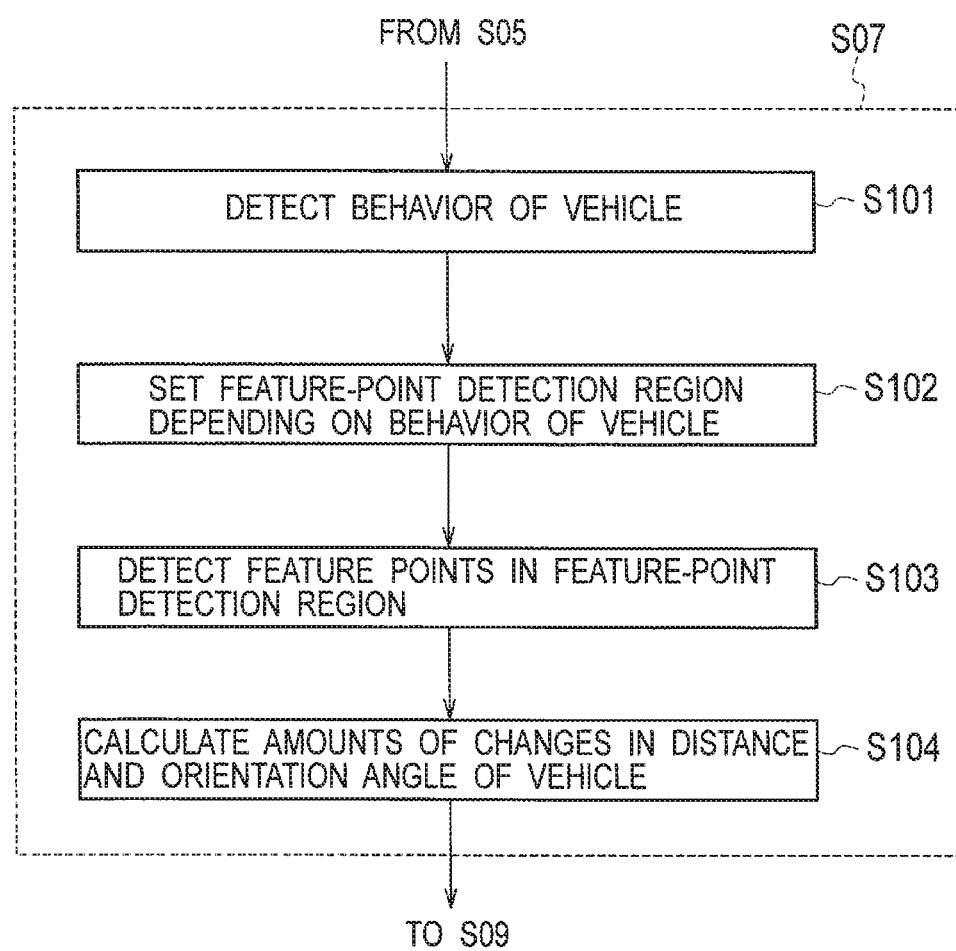

SELF-POSITION CALCULATING APPARATUS AND SELF-POSITION CALCULATING METHOD

TECHNICAL FIELD

The present invention relates to a self-position calculating apparatus and a self-position calculating method.

BACKGROUND

A technique has been known in which: cameras installed in a vehicle capture and obtain images of surroundings of the vehicle; and an amount of movement of the vehicle is obtained based on changes in the images (see Japanese Patent Application Publication No. 2008-175717). Japanese Patent Application Publication No. 2008-175717 aims at obtaining the amount of movement of the vehicle accurately even if the vehicle moves slightly at slow-speed. To this end, a feature point is detected from each image; the position of the feature point is obtained; and thereby, the amount of movement of the vehicle is obtained from the direction and distance of movement (amount of movement) of the feature point.

In addition, a technique of performing a three-dimensional measurement using a laser beam projector for projecting a laser beam in a grid pattern (patterned light beam) has been known (see Japanese Patent Application Publication No. 2007-278951). According to Japanese Patent Application Publication No. 2007-278951, an image of an area of the projected patterned light beam is captured with a camera; the patterned light beam is extracted from the captured image; and a behavior of the vehicle is obtained from the position of the patterned light beam.

In a case where, however, using the technique described in Japanese Patent Application Publication No. 2008-175717 to detect feature points on the road surface in the same area as the area of the projected patterned light beam described in Japanese Patent Application Publication No. 2007-278951, it is difficult to distinguish between the patterned light beam and the feature points. On the other hand, in a case where feature points on the road surface are detected in an area away from the area of the projected patterned light beam, an error in calculating amounts of movements of the feature points becomes larger.

SUMMARY

With the above problems taken into consideration, an object of the present invention is to provide a self-position calculating apparatus and a self-position calculating method which are capable of easily identifying the feature points while distinguishing between the feature points and the patterned light beam, and thereby capable of accurately calculating the self-position of the vehicle.

A self-position calculating apparatus of a first aspect of the present invention projects a patterned light beam onto a road surface around a vehicle; captures and thus obtains an image of the road surface around the vehicle including an area of the projected patterned light beam; calculates an orientation angle of the vehicle relative to the road surface from a position of the patterned light beam on the obtained image; sets a feature-point detection region surrounding the area of the projected patterned light beam on the obtained image, and detects multiple feature points on the road surface within the feature-point detection region; calculates an amount of change in the orientation of the vehicle based on temporal changes in the multiple detected feature points on the road surface; and calculates a current position and a current orientation angle of the vehicle by adding the amount of change in the orientation to an initial position and an initial orientation angle of the vehicle relative to the road surface.

BRIEF DESCRIPTION OF THE DRAWINGS

FIG. 3(a) is a diagram showing how a position of spotlighted areas on a road surface is calculated using the light projector and the camera;

FIG. 3(b) is a diagram showing how a direction of movement of the camera is obtained from temporal changes in a feature point which is detected outside an area of a patterned light beam projected;

FIG. 4 is a diagram showing an image of a patterned light beam which is obtained by applying a binarization process to an image obtained with the camera;

FIG. 6 is a diagram showing feature points detected on the image;

FIG. 16 is a block diagram showing an overall configuration of a self-position calculating apparatus of a second embodiment;

FIG. 20 is a flowchart for explaining an example of a self-position calculating method of the second embodiment;

DETAILED DESCRIPTION OF THE EMBODIMENTS

Figure 1:
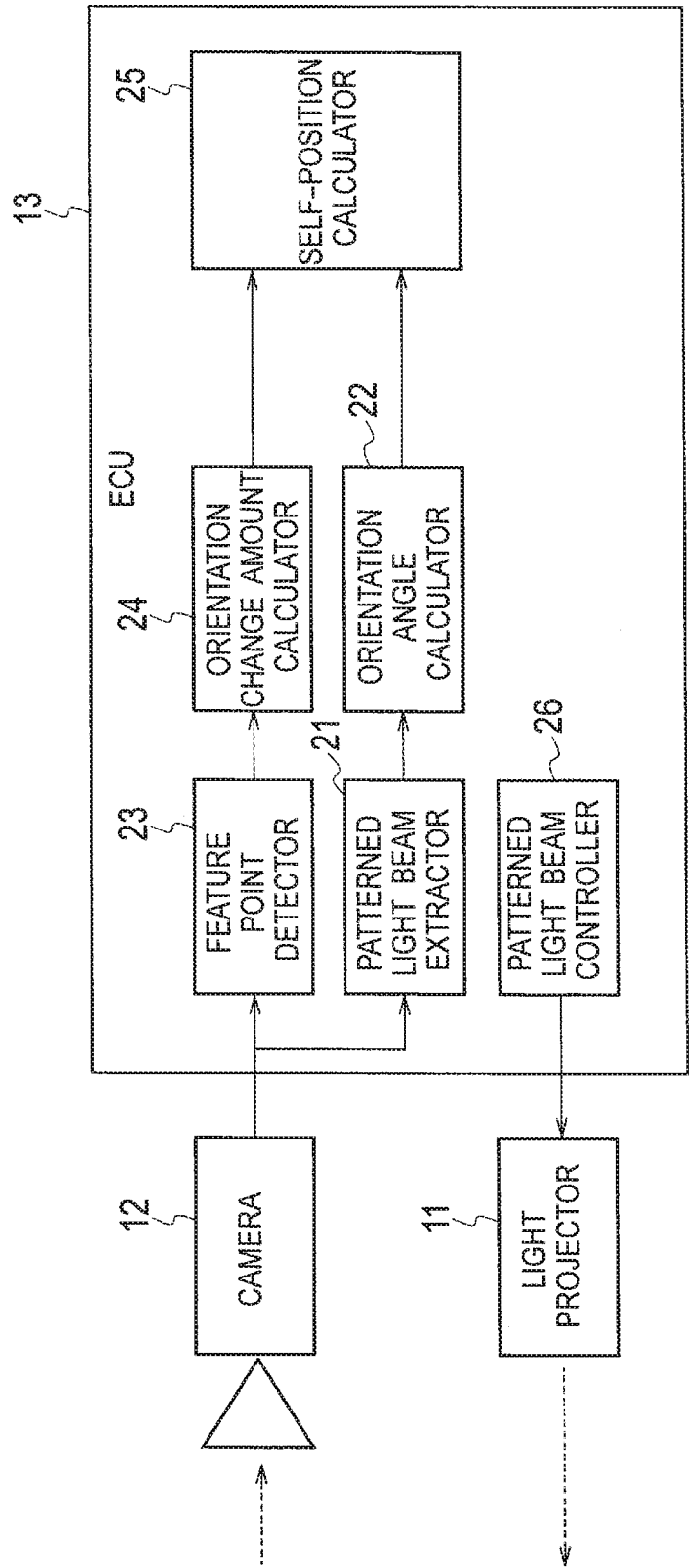
FIG. 1 is a block diagram showing an overall configuration of a self-position calculating apparatus of a first embodiment.

Referring to the drawings, descriptions will be hereinbelow provided for first and second embodiments to which the present invention is applied.

[First Embodiment]

[Hardware Configuration]

To begin with, referring to FIG. 1, descriptions will be provided for a hardware configuration of a self-position calculating apparatus of a first embodiment. The self-position calculating apparatus includes a light projector 11, a camera 12 and an engine control unit (ECU) 13. The light projector 11 is installed in a vehicle, and projects a patterned light beam onto a road surface around the vehicle. The camera 12 is installed in the vehicle, and is an example of an image capturing unit configured to capture and thus obtain images of the road surface around the vehicle, inclusive of an area of the projected patterned light beam. The ECU 13 is an example of a controller configured to control the light projector 11, and to perform a series of information process cycles for calculating the self-position of the vehicle from images obtained with the camera 12.

Figure 2:
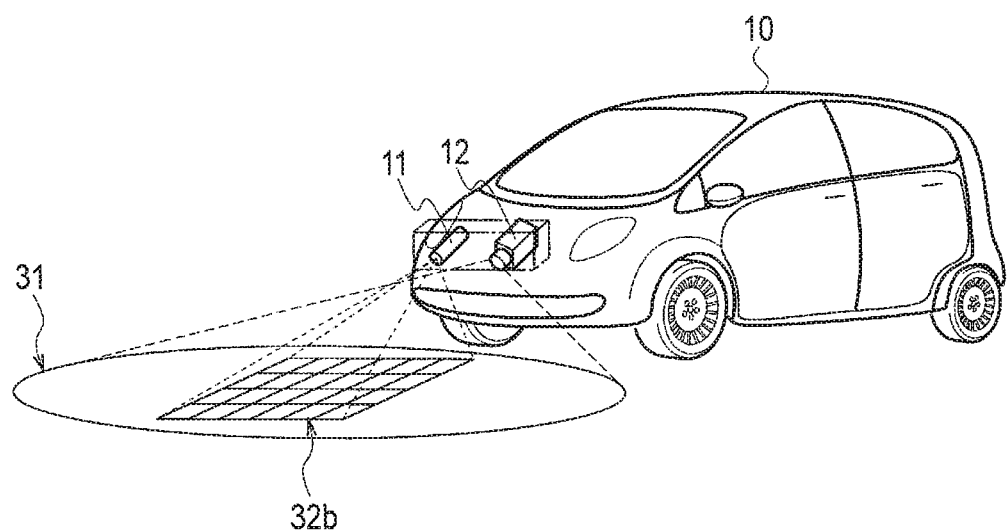
FIG. 2 is an external view showing an example of how a light projector and a camera are installed in a vehicle.

The camera 12 is a digital camera using a solid-state image sensor such as a CCD and a CMOS, and obtains processable digital images. What the camera 12 captures is the road surface around the vehicle. The road surface around the vehicle includes road surfaces in front of, in the back of, at sides of, and beneath the vehicle. As shown in FIG. 2, the camera 12 may be installed in a front section of the vehicle 10, more specifically above a front bumper, for example.

The height at and direction in which to set the camera 12 are adjusted in a way that enables the camera 12 to capture images of feature points (textures) on the road surface 31 in front of the vehicle 10 and the patterned light beam 32b projected from the light projector 11. The focus and diaphragm of the lens of the camera 12 are automatically adjusted as well. The camera 12 repeatedly captures images at predetermined time intervals, and thereby obtains a series of image (frame) groups. Each time the camera 12 captures an image, image data obtained with the camera 12 is transferred to the ECU 13, and is stored in a memory included in the ECU 13.

As shown in FIG. 2, the light projector 11 projects the patterned light beam 32b having a predetermined shape, inclusive of a square or rectangular grid shape, onto the road surface 31 within an image capturing range of the camera 12. The camera 12 captures images of the patterned light beam projected onto the road surface 31. The light projector 11 includes a laser pointer and a diffraction grating, for example. The diffraction grating diffracts the laser beam projected from the pointer. Thereby, as shown in FIGS. 2 to 4, the light projector 11 generates the patterned light beam (32b, 32a) which includes multiple spotlights arranged in a grid or matrix pattern. In examples shown in FIGS. 3 and 4, the light projector 11 generates the patterned light beam 32a including 5×7 spotlights.

Returning to FIG. 1, the ECU 13 includes a CPU, a memory, and a microcontroller including an input-output section. By executing pre-installed computer programs, the ECU 13 forms multiple information processors which function as the self-position calculating apparatus. For each image (frame), the ECU 13 repeatedly performs the series of information process cycles for calculating the self-position of the vehicle from images obtained with the camera 12. Incidentally, the ECU 13 may be also used as an ECU for controlling other systems of the vehicle 10.

In this respect, the multiple information processors include a patterned light beam extractor 21, an orientation angle calculator 22, a feature point detector 23, an orientation change amount calculator 24, a self-position calculator 25, and a patterned light beam controller 26.

Figure 4C:
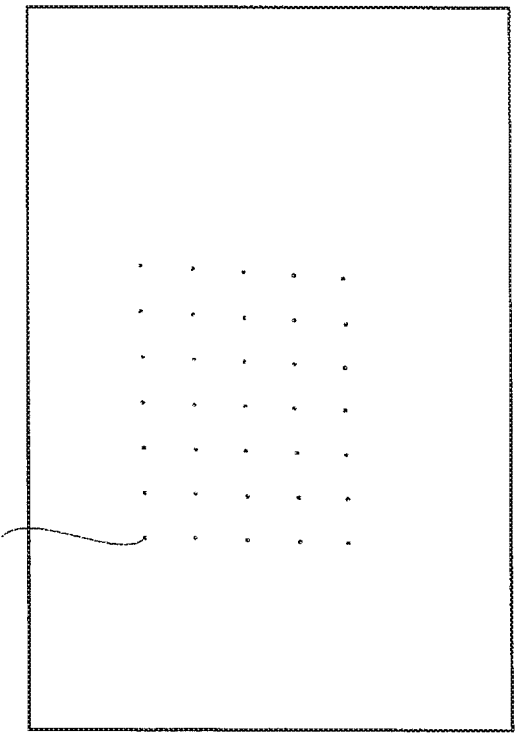
FIG. 4(c) is a diagram showing a position of the center of gravity of spotlights.
Figure 4B:
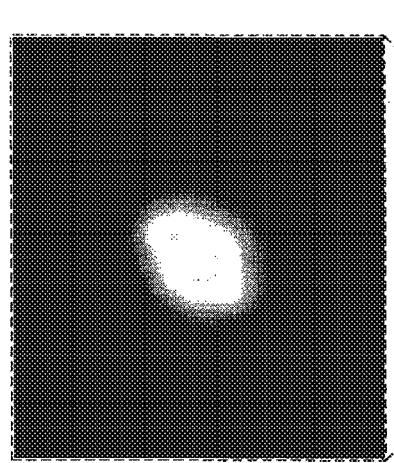
FIG. 4(b) is a magnified diagram showing one spotlight.
Figure 4A:
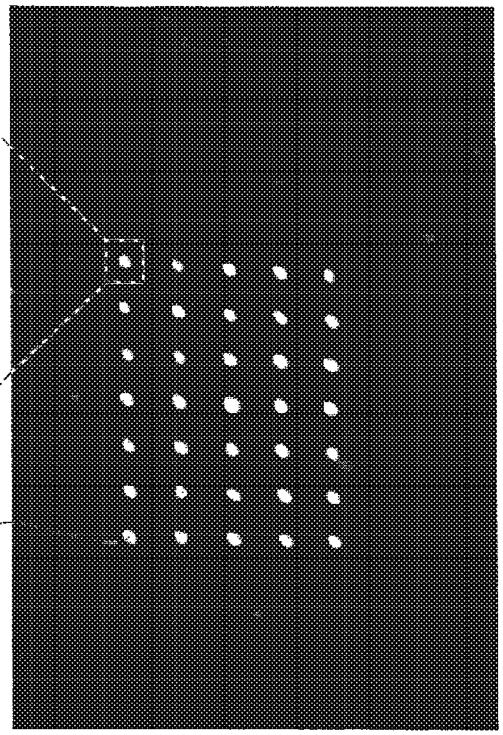
FIG. 4(a) is a diagram showing the entirety of the patterned light beam.

The patterned light beam extractor 21 reads an image obtained with the camera 12 from the memory, and extracts the position of the patterned light beam from this image. For example, as shown in FIG. 3(a), the light projector 11 projects the patterned light beam 32a, which includes the multiple spotlights arranged in a matrix pattern, onto the road surface 31, while the camera 12 detects the patterned light beam 32a reflected off the road surface 31. The patterned light beam extractor 21 applies a binarization process to the image obtained with the camera 12, and thereby extracts only an image of the spotlights Sp, as shown in FIGS. 4(a) and 4(b). Thereafter, as shown in FIG. 4(c), the patterned light beam extractor 21 extracts the position of the patterned light beam 32a by calculating the center-of-gravity position He of each spotlight Sp, that is to say, the coordinates (Uj, Vj) of each spotlight Sp on the image. The coordinates are expressed using the number assigned to a corresponding pixel in the image sensor of the camera 12. In a case where the patterned light beam includes 5×7 spotlights Sp, "j" is an integer not less than 1 but not greater than 35. The memory stores the coordinates (Uj, Vj) of the spotlight Sp on the image as data on the position of the patterned light beam 32a.

The orientation angle calculator 22 reads the data on the position of the patterned light beam 32a from the memory, and calculates the distance and orientation angle of the vehicle 10 relative to the road surface 31 from the position of the patterned light beam 32a on the image obtained with the camera 12. For example, as shown in FIG. 3(a), using the trigonometrical measurement principle, the orientation angle calculator 22 calculates the position of each spotlighted area on the road surface 31, as the position of the spotlighted area relative to the camera 12, from a base length Lb between the light projector 11 and the camera 12, as well as the coordinates (Uj, Vj) of each spotlight on the image. Thereafter, the orientation angle calculator 22 calculates a plane equation of the road surface 31 onto which the patterned light beam 32a is projected, that is to say, the distance and orientation angle (normal vector) of the camera 12 relative to the road surface 31, from the position of each spotlight relative to the camera 12.

It should be noted that in the present embodiment, the distance and orientation angle of the camera 12 relative to the road surface 31 are calculated as an example of the distance and orientation angle of the vehicle 10 relative to the road surface 31 since the position of installation of the camera 12 in the vehicle 10 and the angle for the camera 12 to capture images are already known. In other words, the distance between the road surface 31 and the vehicle 10, as well as the orientation angle of the vehicle 10 relative to the road surface 31 can be obtained by calculating the distance and orientation angle of the camera 12 relative to the road surface 31.

To put it specifically, since the camera 12 and the light projector 11 are fixed to the vehicle 10, the direction in which to project the patterned light beam 32a and the distance (the base length Lb) between the camera 12 and the light projector 11 are already known. For this reason, using the trigonometrical measurement principle, the orientation angle calculator 22 is capable of obtaining the position of each spotlighted area on the road surface 31, as the position (Xj, Yj, Zj) of each spotlight relative to the camera 12, from the coordinates (Uj, Vj) of each spotlight on the image. Hereinafter, the distance and orientation angle of the camera 12 relative to the road surface 31 will be abbreviated as "distance and orientation angle." The distance and orientation angle calculated by the orientation angle calculator 22 are stored into the memory.

It should be noted that the descriptions are provided for the embodiment in which the distance and orientation angle are calculated in each information process cycle.

Furthermore, in many cases, the position (Xj, Yj, Zj) of each spotlight relative to the camera 12 is not present on the same plane. This is because the relative position of each spotlight changes according to the unevenness of the asphalt of the road surface 31. For this reason, the method of least squares may be used to obtain a plane equation which minimizes the sum of squares of distance difference of each spotlight. Data on the thus-calculated distance and orientation angle is used by the self-position calculator 25 shown in FIG. 1.

The feature point detector 23 reads the image obtained with the camera 12 from the memory, and detects feature points on the road surface 31 from the image read from the memory. In order to detect the feature points on the road surface 31, the feature point detector 23 may use a method described in "D. G. Lowe, "Distinctive Image Features from Scale-Invariant Keypoints," Int. J. Comput. Vis., vol. 60, no. 2, pp. 91-110, Nov. 200." Otherwise, the feature point detector 23 may use a method described in "Kanazawa Yasushi, Kanatani Kenichi, "Detection of Feature Points for Computer Vision," IEICE Journal, vol. 87, no. 12, pp. 1043-1048, December 2004."

Figure 6A:
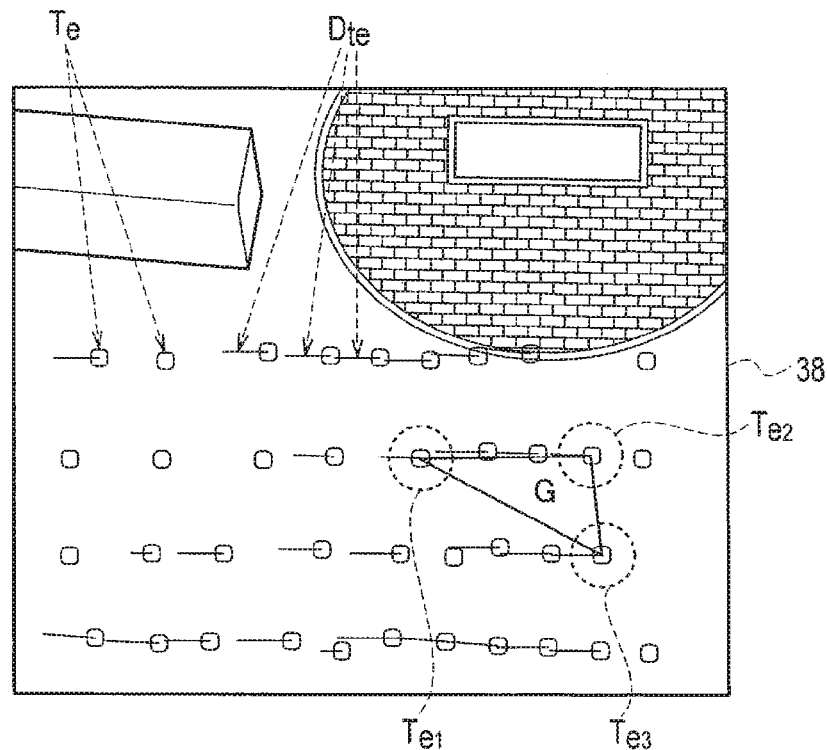
FIG. 6(a) is a diagram showing a first frame (image) obtained at time t.
Figure 6B:
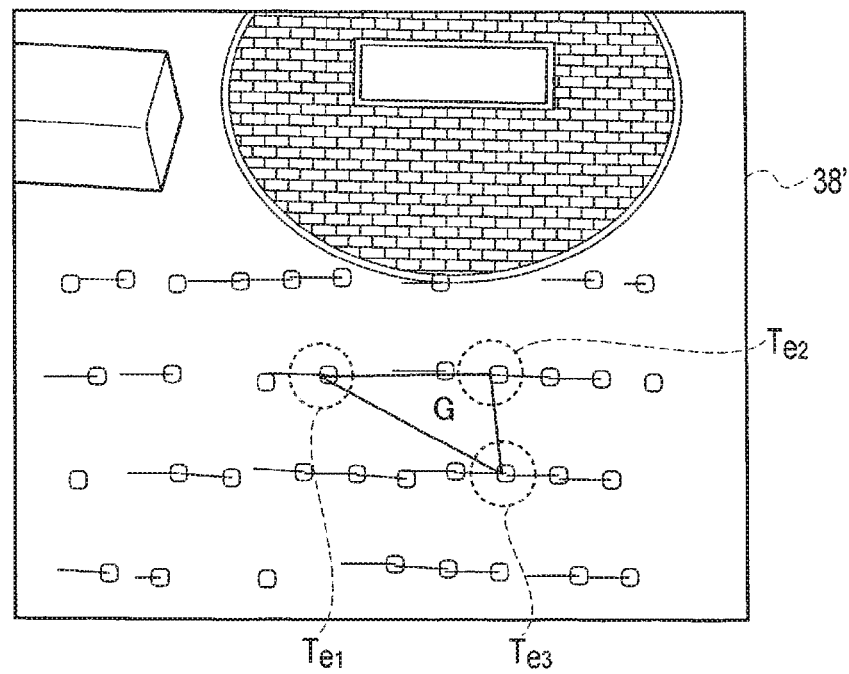
FIG. 6(b) is a diagram showing a second frame obtained at time t+Δt.

To put it specifically, for example, the feature point detector 23 uses the Harris operator or the SUSAN operator as that points, such as apexes of an object, the luminance values of which are largely different from those of the vicinities of the points are detected as the feature points. Instead, however, the feature point detector 23 may use a SIFT (Scale-Invariant Feature Transform) feature amount so that points around which the luminance values change with certain regularity are detected as the feature points. After detecting the feature points, the feature point detector 23 counts the total number N of feature points detected from one image, and assigns identification numbers (i (1≤i≤N)) to the respective feature points. The position (Ui, Vi) of each feature point on the image are stored in the memory inside the ECU 13. FIGS. 6(a) and 6(b) each shows examples of the feature points Te which are detected from the image captured with the camera 12. Furthermore, in FIGS. 6(a) and 6(b), directions of changes of, and amounts of changes in, the feature points Te are expressed with vectors Dte, respectively.

It should be noted that the present embodiment treats particles of asphalt mixture with a particle size of not less than 1 cm but not greater than 2 cm as the feature points on the road surface 31. The camera 12 employs the VGA resolution mode (approximate 300 thousand pixels) in order to detect the feature points. In addition, the distance from the camera 12 to the road surface 31 is approximately 70 cm. Moreover, the direction in which the camera 12 captures images is tilted at approximately 45 degrees to the road surface 31 from the horizontal plane. What is more, the luminance value of each image captured with the camera 12 and thereafter sent to the ECU 13 is within a range of 0 to 255 (0: darkest, 255: brightest).

The orientation change amount calculator 24 reads, from the memory, the positional coordinates (Ui, Vi) of each of the multiple feature points on an image included in a previous image frame (at time t) which is among the image flames captured at each certain information process cycle. Furthermore, the orientation change amount calculator 24 reads, from the memory, the positional coordinates (Ui, Vi) of each of the multiple feature points on the image included in the current frame (at time t+Δt). Thereafter, based on the temporal changes in the positions of the multiple feature points, the orientation change amount calculator 24 obtains an amount of change in the orientation of the vehicle. In this respect, the amount of change in the orientation of the vehicle includes both "amounts of changes in the distance and orientation angle" of the vehicle relative to the road surface and an "amount of movement of the vehicle" on the road surface. Descriptions will be hereinbelow provided for how to calculate the "amounts of changes in the distance and orientation angle" and the "amount of movement of the vehicle".

Figure 5:
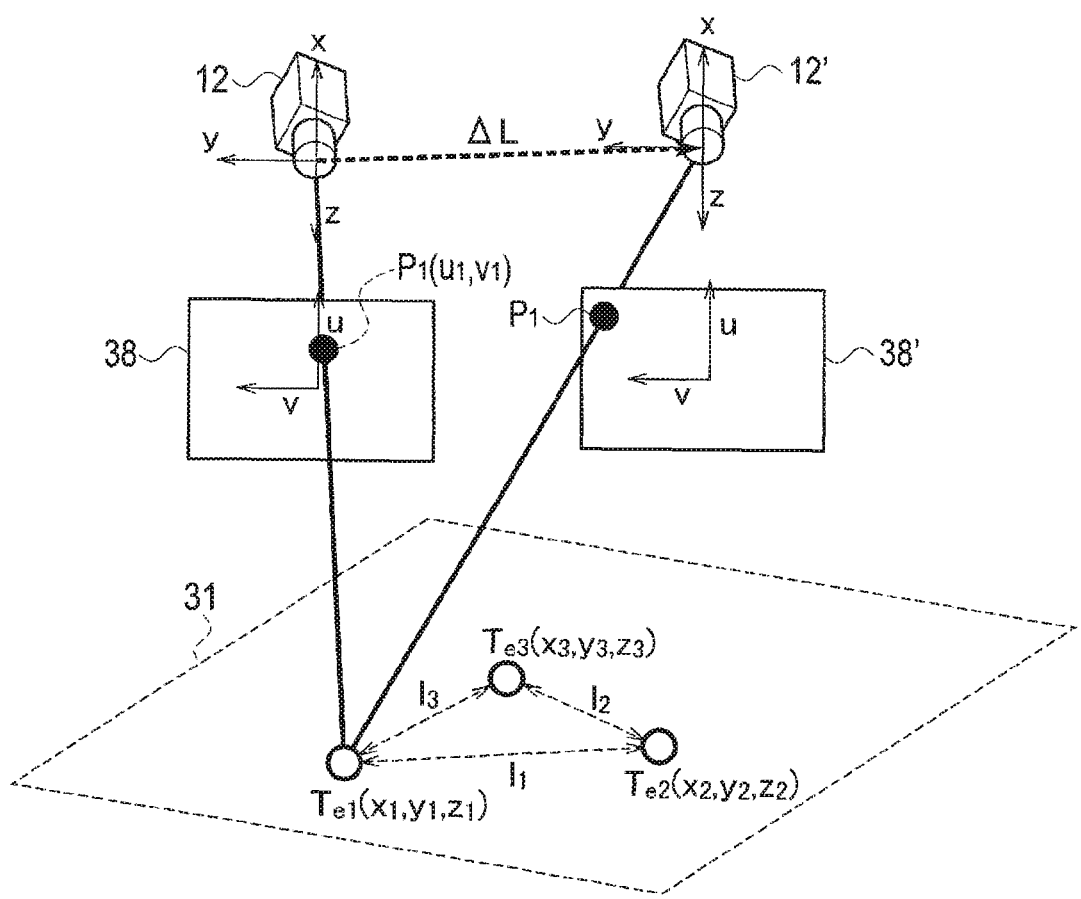
FIG. 5 is a schematic diagram for describing a method of calculating amounts of changes in a distance and orientation angle.

The amounts of changes in the distance and orientation angle can be obtained as follows, for example. FIG. 6(a) shows an example of a first frame (image) 38 (in FIG. 5) captured at time t. Let us assume a case where as shown in FIGS. 5 and 6(a), a relative position (Xi, Yi, Zi) of each of three feature points Te1, Te2, Te3 are calculated on the first frame 38, for example. In this case, a plane G (see FIG. 6(a)) identified by the feature points Te1, Te2, Te3 can be regarded as the road surface. Accordingly, the orientation change amount calculator 24 is capable of obtaining the distance and orientation angle (normal vector) of the camera 12 relative to the road surface (the plane G), from the relative position (Xi, Yi, Zi) of each of the feature points. Furthermore, from an already-known camera model, the orientation change amount calculator 24 is capable of obtaining a distance 11 between the feature points Te1, Te2, a distance 12 between the feature points Te2, Te3 and a distance 13 between the feature points Te3, Te1, as well as an angle between a straight line joining the feature points Te1, Te2 and a straight line joining the feature points Te2, Te3, an angle between the straight line joining the feature points Te2, Te3 and a straight line joining the feature points Te3, Te1, and an angle between the straight line joining the feature points Te3, Te1 and the straight line joining the feature points Te1, Te2. The camera 12 in FIG. 5 shows where the camera is located when camera captures the first frame.

It should be noted that in FIG. 5, the three-dimensional coordinates (Xi, Yi, Zi) of the relative position of each feature point relative to the camera 12 are set in a way that: the Z-axis coincides with the direction in which the camera 12 captures the image; and the X and Y axes orthogonal to each other in a plane including the camera 12 are lines normal to the direction in which the camera 12 captures the image. Meanwhile, the coordinates on the image 38 are set such that: the V-axis coincides with the horizontal direction; and the U-axis coincides with the vertical direction.

FIG. 6(b) shows a second frame 38' obtained at time (t+Δt) where the time length Δt passed from time t. A camera 12' in FIG. 5 shows where the camera is located when camera captures the second frame 38'. As shown in FIGS. 5 and 6(b), the camera 12' captures an image including the feature points Te1, Te2, Te3 as the second frame 38', and the feature point detector 23 detects the feature points Te1, Te2, Te3 from the image. In this case, the orientation change amount calculator 24 is capable of calculating an amount ΔL of movement of the camera 12 in the interval of time Δt from: the relative position (Xi, Yi, Zi) of each of the feature points Te1, Te2, Te3 at time t; a position P1(Ui, Vi) of each feature point on the second frame 38'; and the camera model of the camera 12. Accordingly, the orientation change amount calculator 24 is capable of calculating the amount of movement of the vehicle. Furthermore, the orientation change amount calculator 24 is capable of calculating the amounts of changes in the distance and orientation angle as well. For example, the orientation change amount calculator 24 is capable of calculating the amount (ΔL) of movement of the camera 12 (the vehicle) and the amounts of changes in the distance and orientation angle of the camera 12 (the vehicle) by solving the following system of simultaneous equations (1) to (4). Incidentally, the equation (1) mentioned below is based on an ideal pinhole camera free from strain and optical axial misalignment which is modeled after the camera 12, where λi and f denote a constant and a focal length. The parameters of the camera model may be calibrated in advance.

[Equation (1)]

$$\lambda_i \begin{bmatrix} u_i \\ v_i \\ 1 \end{bmatrix} = \begin{bmatrix} f & 0 & 0 \\ 0 & f & 0 \\ 0 & 0 & 1 \end{bmatrix} \begin{bmatrix} x_i \\ y_i \\ z_i \end{bmatrix} \quad (1)$$

[Equation (2)]

$$(x_1 - x_2)^2 + (y_1 - y_2)^2 + (z_1 - z_2)^2 = l_1^2 \quad (2)$$

[Equation (3)]

$$(x_3 - x_2)^2 + (y_3 - y_2)^2 + (z_3 - z_2)^2 = l_2^2 \quad (3)$$

-continued

[Equation (4)]

$$(x_1 - x_3)^2 + (y_1 - y_3)^2 + (z_1 - z_3)^2 = l_3^2 \quad (4)$$

It should be noted that instead of using all the feature points whose relative positions are calculated in the images detected at time t and time t+Δt, the orientation change amount calculator 24 may select optimum feature points based on positional relationships among the feature points. An example of a selection method usable for this purpose is the epipolar geometry (the epipolar line geometry described in R. I. Hartley, "A linear method for reconstruction from lines and points," Proc. 5th International Conference on Computer Vision, Cambridge, Mass., pp. 882-887 (1995)).

If like in this case, the feature points Te1, Te2, Te3, the relative positions of which on the frame image 38 at time t are calculated, are detected by the feature point detector 23 from the frame image 38' at time t+Δt as well, the orientation change amount calculator 24 is capable of calculating the "amount of change in the orientation angle of the vehicle" from the temporal changes in the relative positions (Xi, Yi, Zi) of the respective feature points on the road surface and the temporal changes of the positions (Ui, Vi) of the respective feature points on the image. Furthermore, the orientation change amount calculator 24 is capable of calculating the amount of movement of the vehicle.

To put it specifically, if three or more feature points each corresponding between the previous and current frames can be detected continuously from the two frames, the continuation of the process (integration operation) of adding the amounts of changes in the distance and orientation angle makes it possible to continuously update the distance and orientation angle without using the patterned light beam 32a. Nevertheless, the distance and orientation angle calculated using the patterned light beam 32a, or a predetermined initial position and orientation angle, may be used for the first information process cycle. In other words, the distance and orientation angle which are starting points of the integration operation may be calculated using the patterned light beam 32a, or may be set at predetermined initial values. It is desirable that the predetermined initial position and the predetermined initial orientation angle are a distance and an orientation angle determined with at least the occupants and payload of the vehicle 10 taken into consideration. For example, the distance and orientation angle calculated using the patterned light beam 32a which is projected while the ignition switch of the vehicle 10 is on and when the shift position is moved from the parking position to another position may be used as the predetermined initial position and the predetermined initial orientation angle. Thereby, it is possible to obtain the distance and orientation angle which is not affected by the roll or pitch of the vehicle 10 due to a turn, acceleration or deceleration of the vehicle 10.

It should be noted that the associating of the feature points in the current frame with the feature points in the previous frame may be achieved, for example, by: storing an image of a small area around each detected feature point into the memory; and for each feature point, making a determination from a similarity in luminance information and a similarity in color information. To put it specifically, the ECU 13 stores a 5(horizontal)×5(vertical)-pixel image around each detected feature point into the memory. If for example, the difference in the luminance information among 20 or more pixels is equal to or less than 1%, the orientation change amount calculator 24 determines that the feature points in question correspond between the current and previous frames. Thereafter, the amount of change in the orientation obtained through the foregoing process is used by the self-position calculator 25 in the next process step to calculate the self-position of the vehicle 10.

The self-position calculator 25 calculates the current distance and orientation angle of the vehicle 10 from the "amounts of changes in the distance and orientation angle" calculated by the orientation change amount calculator 24. In addition, the self-position calculator 25 calculates the self-position of the vehicle 10 from the "amount of movement of the vehicle" calculated by the orientation change amount calculator 24.

Descriptions will be provided for how to perform the foregoing calculations in a specific case where the distance and orientation angle calculated by the orientation angle calculator 22 (that is to say, the distance and orientation angle calculated using the patterned light beam) are set as the starting points of the calculations. In this case, the self-position calculator 25 updates the distance and orientation angle with the most recent numerical values by sequentially adding (performing an integration operation on) the amounts of changes in the distance and orientation angle calculated for each frame by the orientation change amount calculator 24 to the starting points, that is to say, the distance and orientation angle calculated by the orientation angle calculator 22. In addition, the self-position calculator 25 calculates the self-position of the vehicle by: setting the position of the vehicle, which is obtained when the orientation angle calculator 22 calculates the distance and orientation angle, as the starting point (the initial position of the vehicle); and by sequentially adding (performing an integration operation on) the amount of movement of the vehicle to the initial position of the vehicle. For example, by setting the starting point (the initial position of the vehicle) which matches the position of the vehicle on a map, the self-position calculator 25 is capable of sequentially calculating the current self-position of the vehicle on the map.

Thereby, the orientation change amount calculator 24 is capable of calculating the self-position of the vehicle by obtaining the amount ($\Delta L$) of movement of the camera 12 for the time length $\Delta t$. In addition, the orientation change amount calculator 24 is capable of calculating the amounts of changes in the distance and orientation angle at the same time. For these reasons, with the amounts of changes in the distance and orientation angle of the vehicle taken into consideration, the orientation change amount calculator 24 is capable of accurately calculating the amount ($\Delta L$) of movement in six degrees of freedom (forward/rearward moving, leftward/rightward moving, upward/downward moving, yawing, pitching and rolling). In other words, an error in estimating the amount ($\Delta L$) of movement can be minimized even if the distance and orientation angle are changed by the roll or pitch due to the turn, acceleration or deceleration of the vehicle 10.

In the present embodiment, the amount ($\Delta L$) of movement of the camera 12 is calculated by: calculating the amounts of changes in the distance and orientation angle; and updating the distance and orientation angle. Instead, however, the amount ($\Delta L$) of movement of the camera 12 may be calculated by: calculating the amount of change in only the orientation angle of the camera 12 relative to the road surface 31; and updating only the orientation angle of the camera 12. In this case, it may be supposed that the distance between the road surface 31 and the camera 12 remains constant. This makes it possible to reduce the operation load on the ECU 13 while minimizing the error in estimating the amount ($\Delta L$) of movement with the amount of change in the orientation angle taken into consideration, and to increase the operation speed of the ECU 13.

The patterned light beam controller 26 controls the projection of the patterned light beam 32a by the light projector 11. For example, after the ignition switch of the vehicle 10 is turned on, once the self-position calculating apparatus becomes activated, the patterned light beam controller 26 starts to project the patterned light beam 32a. Thereafter, until the self-position calculating apparatus stops its operation, the patterned light beam controller 26 continues projecting the patterned light beam 32a. Otherwise, the patterned light beam controller 26 may alternately turn on and off the light projection in predetermined intervals.

Figure 7A:
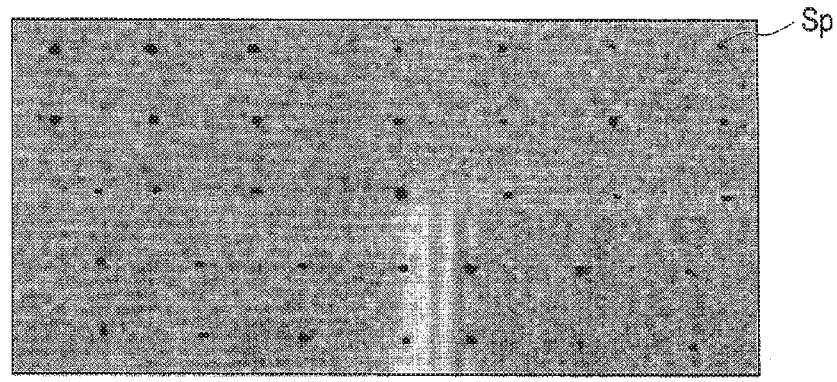
FIG. 7(a) is a diagram showing an image obtained by the camera.
Figure 7B:
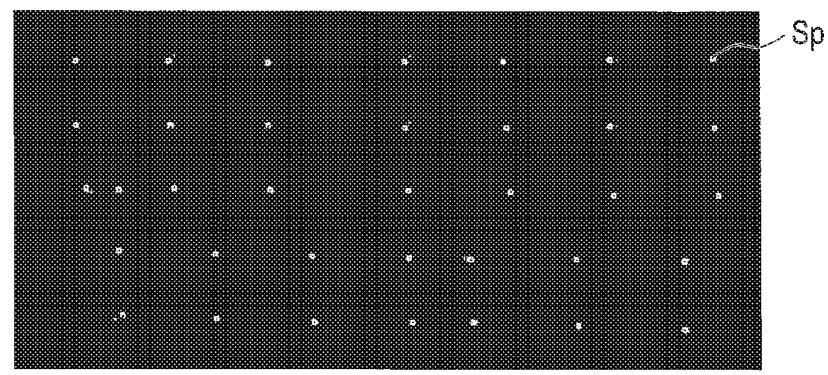
FIG. 7(b) is a diagram showing an image of the patterned light beam which is obtained by applying a binarization process to the image obtained by the camera.
Figure 7C:
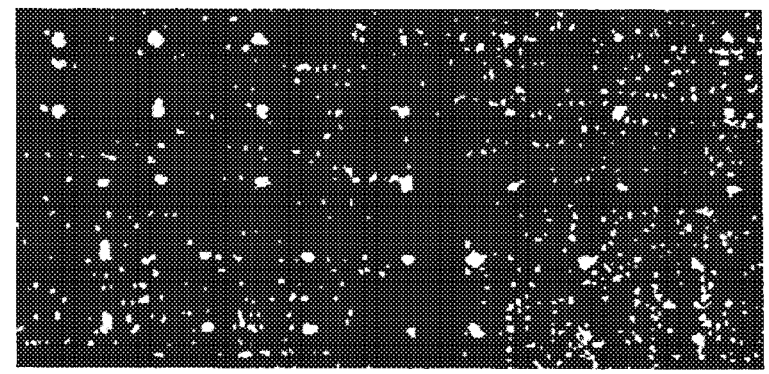
FIG. 7(c) is a diagram showing a result of detecting feature points.

In the case where the patterned light beam 32a including 5×7 spotlights SP is projected, an image as shown in FIG. 7(a) is obtained by the camera 12. Applying the binarization process to the image, the patterned light beam extractor 21 can extract the patterned light beam (spotlights) Sp as shown in FIG. 7(b). Meanwhile, the feature point detector 23 has difficulty in detecting feature points on the road surface 31 from the same area as the area of the projected patterned light beam Sp, because as shown in FIG. 7(c), it is difficult to identify the feature points on the road surface 31 against the patterned light beam Sp. In contrast to this, when feature points on the road surface 31 are detected by the feature point detector 23 from an area away from an area of the projected patterned light beam 32a, errors in calculating amounts of movements of the feature points become larger.

With this taken into consideration, in this embodiment, the feature point detector 23 is configured to set a feature-point detection region surrounding regions onto which the light projector 11 projects the patterned light beam, and to perform detection of feature points on the road surface 31 within the feature-point detection region. In this respect, the feature-point detection region means a region being away from the patterned light beams by a distance which makes the influence of the patterned light beams sufficiently small to detect the feature points on the road surface 31, and being adjacent to the patterned light beams by this distance. The distance which makes the influence of the patterned light beams become sufficiently small can be obtained through an experiment in advance. In this embodiment, as an example of the distance which makes the influence of the patterned light beams sufficiently small, a distance which eliminates false detections at a 99% or higher probability under possible light environments is obtained in advance.

Figure 8:
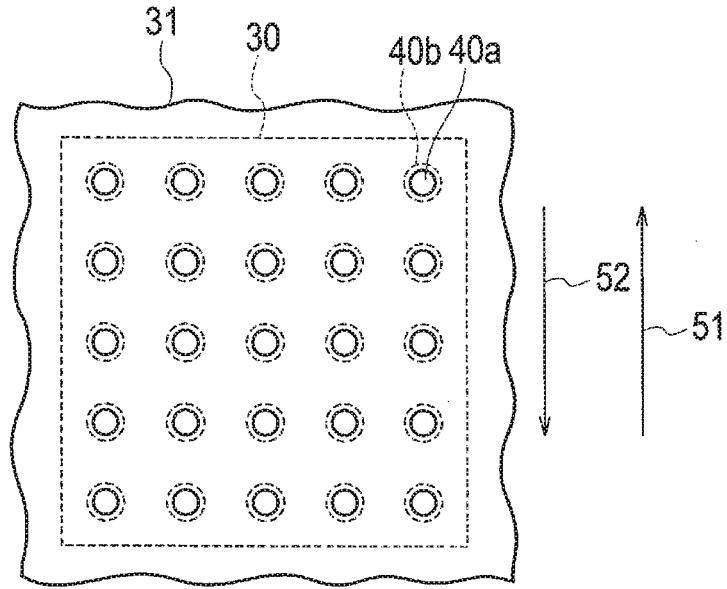
FIG. 8 is a schematic diagram showing patterned light beam regions of 5×5 spotlights projected.

For example, as shown in FIG. 8, the light projector 11 projects 25 (5×5) spotlights as patterned light beams 40a onto the inside of an image capturing area 30 of the camera 12. In FIG. 8, an arrow 51 indicates a movement direction of the vehicle 10, while an arrow 52 pointing in a direction opposite to that of the arrow 51 indicates a movement direction of the feature points. In this case, each patterned light beam region 40b is a region with a boundary away from the patterned light beam (spotlight) 40a by a distance which makes the influence of the patterned light beam 40a sufficiently small to detect the feature points.

Figure 9:
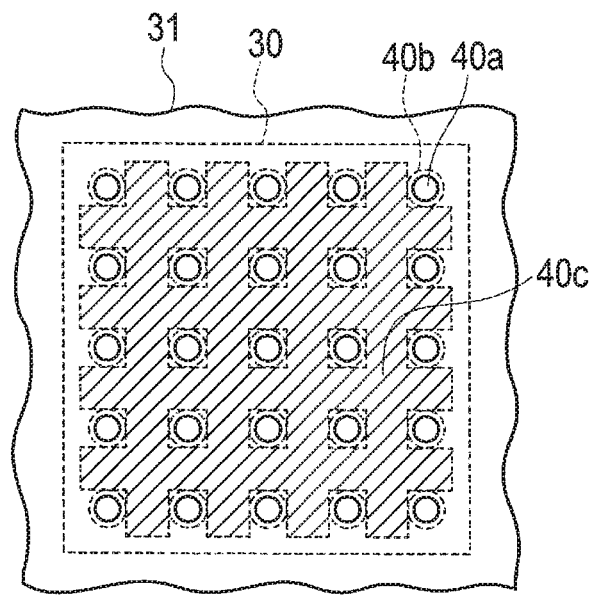
FIG. 9 is a schematic diagram showing an example of a feature-point detection region set in a way to surround the patterned light beam regions of the 5×5 spotlights projected.

As shown in FIG. 9, the feature point detector 23 sets the feature-point detection region 40c inside the image capturing area 30 of the camera 12 in a way to surround the patterned light beam regions 40b. The feature-point detection region 40c is shaped like a grid, and is adjacent to the patterned light beam regions 40b. The feature point detector 23 performs feature point detection within the feature-point detection region 40c in the image capturing area 30 of the camera 12 while excluding the insides of the patterned light beam regions 40b from the coverage of the feature point detection. As a result, it is possible to easily distinguish between the patterned light beams 40a and the feature points. Accordingly, the feature points can be detected accurately. The feature-point detection region 40c may be set adjacent to the patterned light beams 40a instead of adjacent to the patterned light beam regions 40b. In other words, the feature-point detection region 40c may be set as a region excluding the patterned light beams 40a.

[Information Process Cycle]

Figure 10:
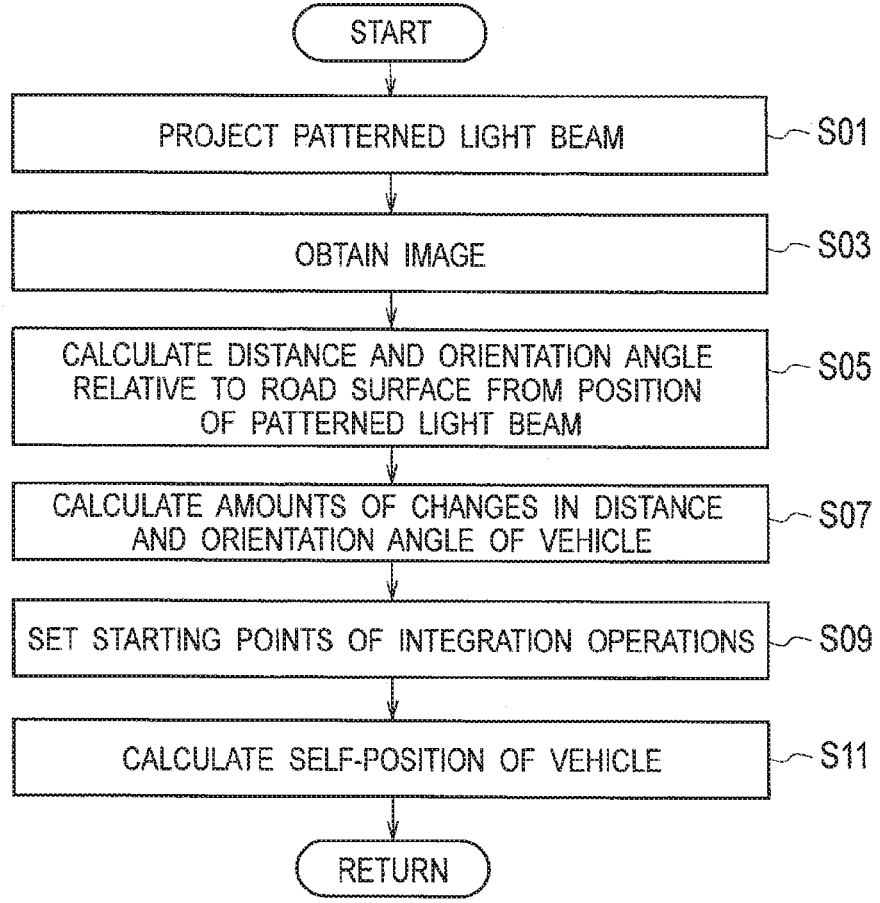
FIG. 10 is a flowchart for explaining an example of a self-position calculating method of the first embodiment.

Next, referring to FIG. 10, descriptions will be provided for an information process cycle to be repeatedly performed by the ECU 13. This information process cycle is an example of a self-position calculating method of calculating the self-position of the vehicle 10 from the image obtained by the camera 12.

The information process cycle shown in a flowchart of FIG. 10 is started at the same time as the self-position calculating apparatus becomes activated after the ignition switch of the vehicle 10 is turned on, and is repeatedly performed until the self-position calculating apparatus stops its operation.

In step S01 in FIG. 10, the patterned light beam controller 26 controls the light projector 11 to make the light projector 11 to project the patterned light beam 32a onto the road surface 31. Using the flowchart in FIG. 10, descriptions will be provided for a case where the patterned light beam 40a shown in FIG. 8 is continuously projected.

Proceeding to step S03, the ECU 13 controls the camera 12 to obtain the image 38 by making the camera 12 shoot the road surface 31 around the vehicle 10, inclusive of an area of the projected patterned light beam 40a. The ECU 13 stores the data on the image obtained with the camera 12 into the memory.

It should be noted that the ECU 13 is capable of automatically controlling the diaphragm of the camera 12. The ECU 13 may be configured to perform a feedback control of the diaphragm of the camera 12 in a way that makes a value of brightness of the next image becomes equal to a median value between the maximum and minimum values in accordance with of an average of the brightness of the image 38 obtained in the previous information process cycle. Otherwise, since the value of the brightness of the area of the projected patterned light beam 40a, the ECU 13 may obtain an average value of the brightness of the previously-obtained image 38 from an area outside a part from which the patterned light beam 40a is extracted.

Proceeding to step S05, to begin with, the patterned light beam extractor 21 reads the image 38 obtained with the camera 12 from the memory, and extracts the position of the patterned light beam 40a from the image 38, as shown in FIG. 4(c). The patterned light beam extractor 21 stores the coordinates (Uj, Vj) of each spotlight Sp on the image, which are calculated as the data on the position of the patterned light beam 40a, into the memory.

Furthermore, in step S05, the orientation angle calculator 22 reads the data on the position of the patterned light beam 40a from the memory, calculates the distance and orientation angle of the vehicle 10 relative to the road surface 31 from the position of the patterned light beam 40a, and stores the thus-calculated distance and orientation angle into the memory.

Proceeding to step S07, the ECU 13 detects the feature points Te from the image 38, extracts the feature points Te each corresponding between the previous and current information process cycles from the detected feature points Te, and calculates the amounts of changes in the distance and orientation angle from the positions (Ui, Vi) of the respective extracted feature points Te on the image. In addition, the ECU 13 calculates the amount of movement of the vehicle.

To put it specifically, to begin with, the feature point detector 23 reads the image 38 of the image capturing area 30 corresponding to FIG. 8, which is obtained with the camera 12, from the memory, and sets the feature-point detection region 40c in a way to surround the patterned light beam region 40b, as shown in FIG. 9. In addition, the feature point detector 23 detects the feature points Te, which are on the road surface 31 in the feature-point detection region 40c, from the image 38, and stores the positions (Ui, Vi) of the respective feature points Te on the image into the memory.

The orientation change amount calculator 24 reads the positions (Ui, Vi) of the respective feature points Te on the image from the memory, and calculates the positions (Xi, Yi, Zi) of the respective feature points Te relative to the camera 12 from the distance and orientation angle, as well as the positions (Ui, Vi) of the respective feature points Te on the image, which are calculated by the orientation angle calculator 22. Incidentally, the orientation change amount calculator 24 uses the distance and orientation angle which are set in step S09 in the previous information process cycle. Thereafter, the orientation change amount calculator 24 stores the positions (Xi, Yi, Zi) of the respective feature points Te relative to the camera 12 into the memory.

After that, the orientation change amount calculator 24 reads the positions (Ui, Vi) of the respective feature points Te on the image, and the relative positions (Xi, Yi, Zi) of the respective feature points Te calculated in step S07 in the previous information process cycle from the memory. The orientation change amount calculator 24 calculates the amounts of changes in the distance and orientation angle using: the relative positions (Xi, Yi, Zi) of the respective feature points Te each corresponding between the previous and current information process cycles; and the positions (Ui, Vi) of the respective thus-corresponding feature points Te on the image. Furthermore, the orientation change amount calculator 24 calculates the amount of movement of the vehicle from the previous relative positions (Xi, Yi, Zi) of the respective feature points Te and the current relative positions (Xi, Yi, Zi) of the respective feature points Te, and stores the resultant amount of movement of the vehicle into the memory. The "amounts of changes in the distance and orientation angle" and the "amount of movement of the vehicle" which are calculated in step S07, are used for the process in step S11.

Proceeding to step S09, where in the first information process cycle, the ECU 13 sets the starting points of the integration operations for calculating the self-position by use of the distance and orientation angle calculated using the patterned light beam 40a, or by use of the predetermined initial position and the predetermined initial orientation angle. In the subsequent information process cycles, if three or more feature points associated between the previous and current frames can be continuously detected, the continuation of the processes (integration processes) of adding the amounts of changes in the distance and orientation angle makes it possible to continuously update the distance and orientation angle without using the patterned light beam 40a.

Proceeding to step S11, the self-position calculator 25 calculates the self-position of the vehicle 10 from: the starting points of the integration operation set in step S09; and the amounts of changes in the distance and orientation angle of the vehicle 10 calculated in the process in step S07.

Thus, the self-position calculating apparatus of the embodiment is capable of calculating the self-position of the vehicle 10 by repeatedly performing the foregoing series of information process cycles to integrating the amount of movement of the vehicle 10.

[First Modification]

Figure 11:
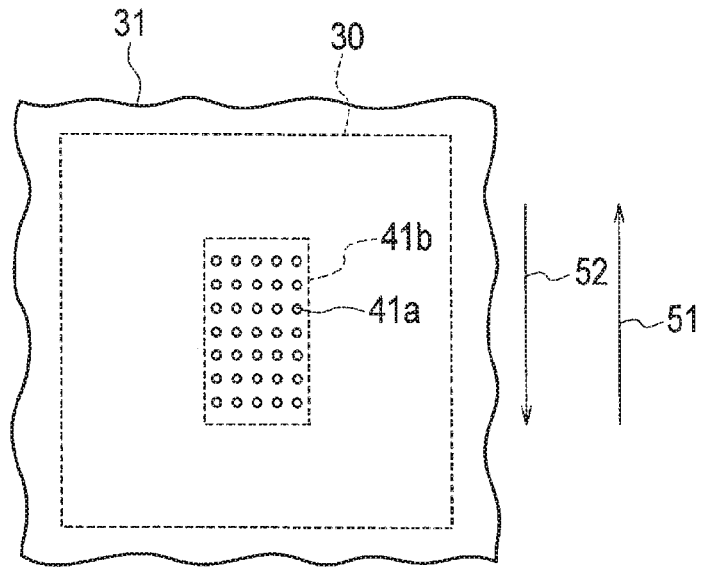
FIG. 11 is a schematic diagram showing an example of a patterned light beam region of spotlights densely projected.
Figure 12:
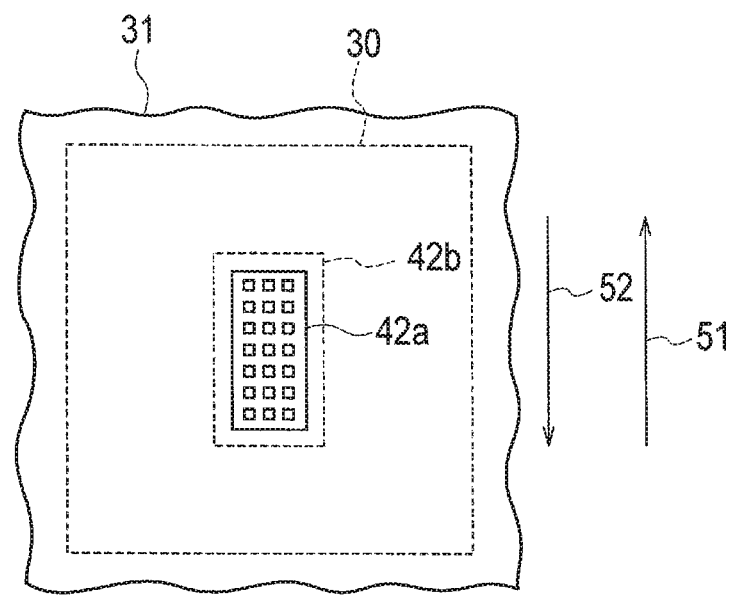
FIG. 12 is a schematic diagram showing an example of a patterned light beam region of a grid-patterned light beam is projected.

Next, as a first modification, another example of the feature-point detection region setting method will be described. As shown in FIG. 11, the light projector 11 may be configured to densely project 35 (7×5) spotlights as patterned light beams 41a. In this case, a patterned light beam region 41b is set as a region away from the patterned light beams 41a by a distance which makes the influence of the patterned light beams 41a sufficiently small to detect the feature points. Since the spotlights as the patterned light beams 41a are projected densely, the patterned light beam region 41b is formed covering all the spotlights as a whole. Incidentally, in a case where as shown in FIG. 12, a grid-patterned light beam as a patterned light beam 42a is projected instead of the spotlights, a patterned light beam region 42b is similarly formed surrounding the grid-patterned light beam.

Figure 13:
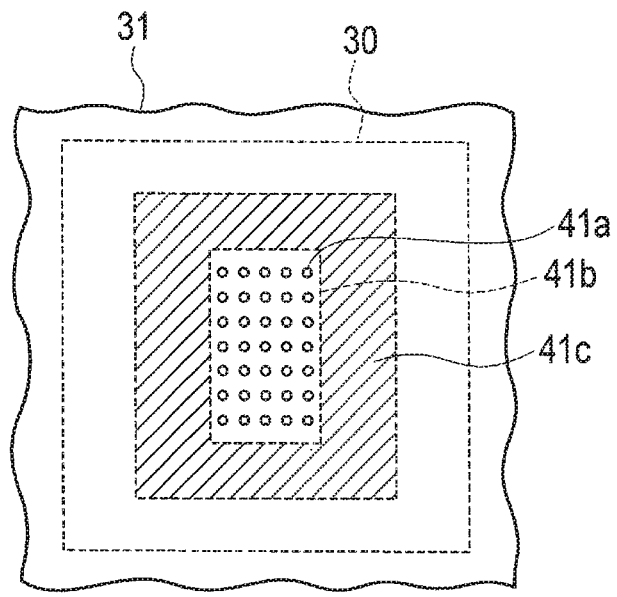
FIG. 13 is a schematic diagram showing an example of a feature-point detection region set surrounding a patterned light beam region of spotlights densely projected.

In the case where the patterned light beams 41a shown in FIG. 11 are projected, the feature point detector 23 sets a feature-point detection region 41c in a way to surround the patterned light beam region 41b, as shown in FIG. 13. The feature-point detection region 41c is shaped like a frame, and is adjacent to the patterned light beam region 41b. The feature point detector 23 performs feature point detection within the feature-point detection region 41c in the image capturing area 30 of the camera 12 while excluding the patterned light beam region 41b from the coverage of the feature point detection.

[Second Modification]

Figure 14:
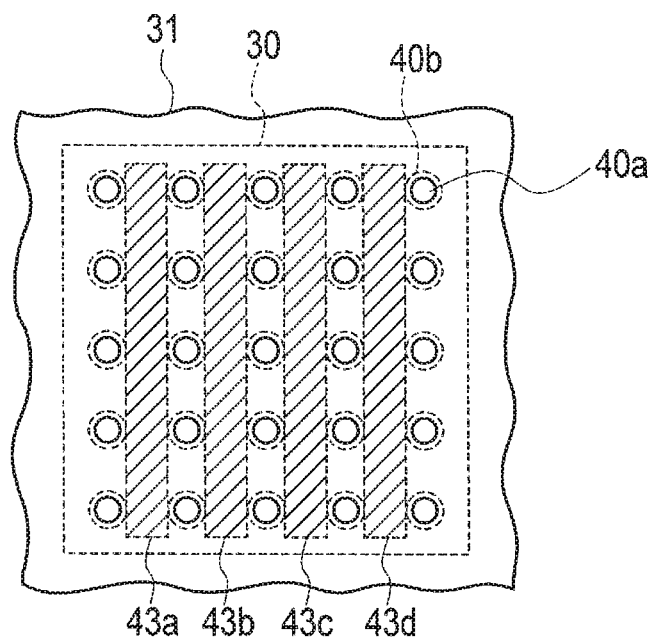
FIG. 14 is a schematic diagram showing an example of feature-point detection regions set on the left and right of the patterned light beam regions of the 5×5 spotlights projected.

Next, as a second modification, another example of the feature-point detection region setting method will be described. The feature point detector 23 may be configured to, as shown in FIG. 14, set feature-point detection regions 43a, 43b, 43c, 43d on the left and right (in a vehicle-width direction) of the patterned light beam regions 40b in the case where as shown in FIG. 8, the light projector 11 projects the 5×5 (=25) spotlights as the patterned light beams 40a. The feature-point detection regions 43a, 43b, 43c, 43d are adjacent to the patterned light beam regions 40b, and each have a rectangular pattern whose width is wider in the movement direction 52 of the feature points than in the vehicle-width direction. The vehicle-width direction is a direction which is orthogonal to the movement direction 52 of the feature points, and in which the feature points move less than in the movement direction 52. The feature point detector 23 performs feature point detection within each of the feature-point detection regions 43a, 43b, 43c, 43d in the image capturing area 30 of the camera 12.

Figure 15:
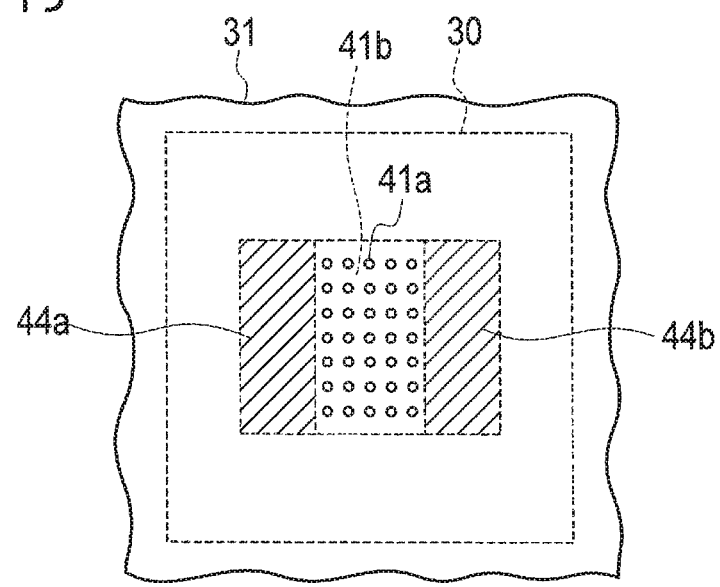
FIG. 15 is a schematic diagram showing another example of feature-point detection regions set on the left and right of the patterned light beam region of the spotlights densely projected.

Furthermore, the feature point detector 23 may be configured to, as shown in FIG. 15, set feature-point detection regions 44a, 44b on the left and right (in the vehicle-width direction) of the patterned light beams 41a in the case where the spotlights as the patterned light beams 41a are densely projected as shown in FIG. 11, or in the case where the grid-patterned light beam is projected. The feature-point detection regions 44a, 44b are adjacent to the patterned light beam region 41b, and each have a rectangular pattern whose width is wider in the movement direction 52 of the feature points than in the vehicle-width direction. The feature point detector 23 performs feature point detection within each of the feature-point detection regions 44a, 44b in the image capturing area 30 of the camera 12.

[Effects of First Embodiment]

According to the first embodiment, the feature-point detection region 40c, 41c is set surrounding the patterned light beam regions 40b, 41b inclusive of the patterned light beams 40a, 41a; and detection of feature points Te is performed within the feature-point detection region 40c, 41c. This makes it possible to detect feature points within the region different from but adjacent to the region from which the patterned light beams 40a or the patterned light beams 41a are extracted. For this reason, the feature points can be accurately detected while distinguished from the patterned light beams 40a and the patterned light beams 41a. Accordingly, the self-position of the vehicle can be accurately detected using the thus-detected feature points.

Otherwise, either the feature-point detection regions 43a to 43d or the feature-point detection regions 44a, 44b are set on the left and right (in the vehicle-width direction) of the patterned light beam regions 40b, 41b inclusive of the patterned light beams 40a, 41a, and feature point detection is performed within the feature-point detection regions 43a to 43d or the feature-point detection regions 44a, 44b. Thereby, the detection of the feature points can be carried out within the regions whose widths in the movement direction 52 of the feature points are longer than those in the vehicle-width direction so that feature points more easily associated between the previous and current frames can be detected.

(Second Embodiment)

[Hardware Configuration]

A self-position calculating apparatus of a second embodiment differs from the self-position calculating apparatus of the first embodiment in that as shown in FIG. 16, the self-position calculating apparatus of the second embodiment includes a vehicle behavior detector 14 in addition to the configuration of the self-position calculating apparatus of the first embodiment. A wheel speed sensor configured to detect a vehicle speed, or a yaw rate sensor configured to detect a speed of the vehicle in the lateral direction (yaw rate) may be used as the vehicle behavior detector 14, for example. The other configuration of the self-position calculating apparatus of the second embodiment is substantially the same as that of the self-position calculating apparatus of the first embodiment. For this reason, duplicate descriptions will be omitted.

Figure 17A:
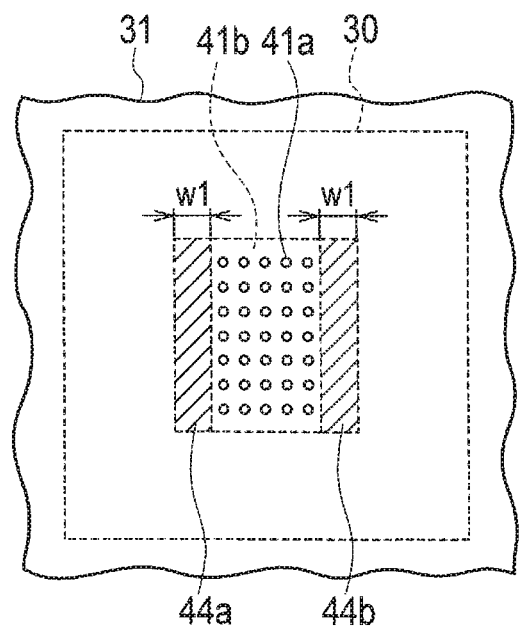
FIG. 17(a) is a schematic diagram showing an example of the feature-point detection regions as set when a lateral-direction speed is relatively small.
Figure 17B:
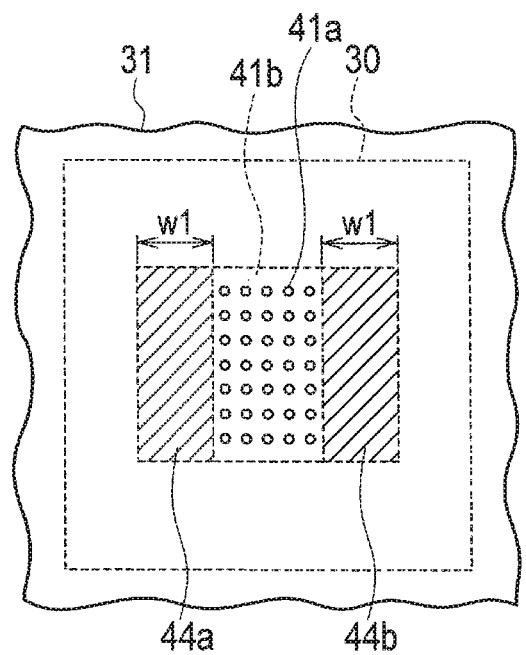
FIG. 17(b) is a schematic diagram showing an example of the feature-point detection regions as set when the lateral-direction speed is relatively large.

The feature point detector 23 sets the feature-point detection region(s) depending on the behavior of the vehicle 10 which is detected by the vehicle behavior detector 14. For example, in the case where the 5×7 spotlights as the patterned light beams 41a are densely projected, the feature point detector 23 makes a lateral width w1 of the feature-point detection regions 44a, 44b become narrower as shown in FIG. 17(a) as the absolute value of the lateral-direction speed detected by the vehicle behavior detector 14 becomes smaller, and makes the lateral width w1 of the feature-point detection regions 44a, 44b become wider as shown in FIG. 17(b) as the absolute value of the lateral-direction speed detected by the vehicle behavior detector 14 becomes larger.

Figure 18:
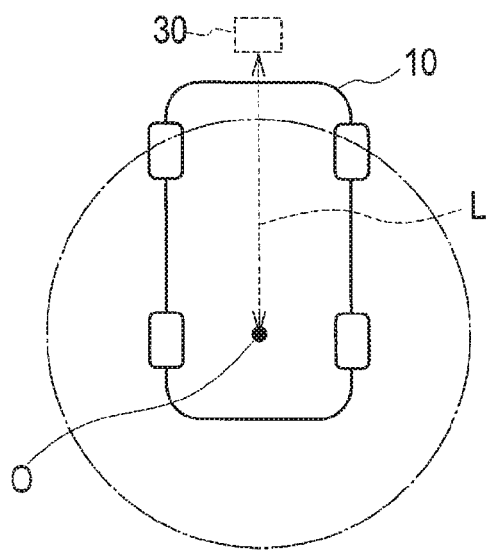
FIG. 18 is a schematic diagram for explaining a specific example of the feature-point detection region setting method.

To put it specifically, the lateral width w1 of the feature-point detection regions 44a, 44b are determined depending on: the position of the image capturing area 30 of the camera 12; and a frame rate. Let us take a case shown in FIG. 18, for example, where: the position of the image capturing area 30 of the camera 12 is located at a distance of L [m] from the center O of the rear-wheel axle of the vehicle 10; and the frame rate is at F [fps]. In this case, if the yaw rate as the lateral-direction speed of the vehicle 10 running at a very slow speed while turning around the center O of the rear-wheel axle is at γ [rad/sec], an amount of lateral-direction movement of the feature points Te per frame is at Lγ/F [m]. Theoretically, the detection of the feature points Te while associating the feature points Te between the previous and current frames requires the regions to have a lateral-direction width which is equal to or greater than Lγ/F. In this embodiment, with a margin taken into consideration, a width which is five times the amount of lateral-direction movement of the feature points Te per frame (5×Lγ/F) is set as the lateral width w1 of the feature-point detection regions 44a, 44b.

Figure 19A:
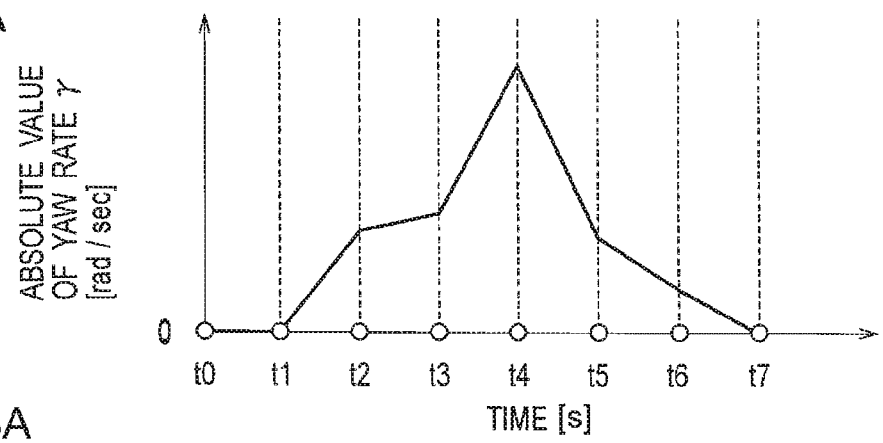
FIG. 19(a) is a graph showing a temporal change in the absolute value of the lateral-direction speed.
Figure 19B:
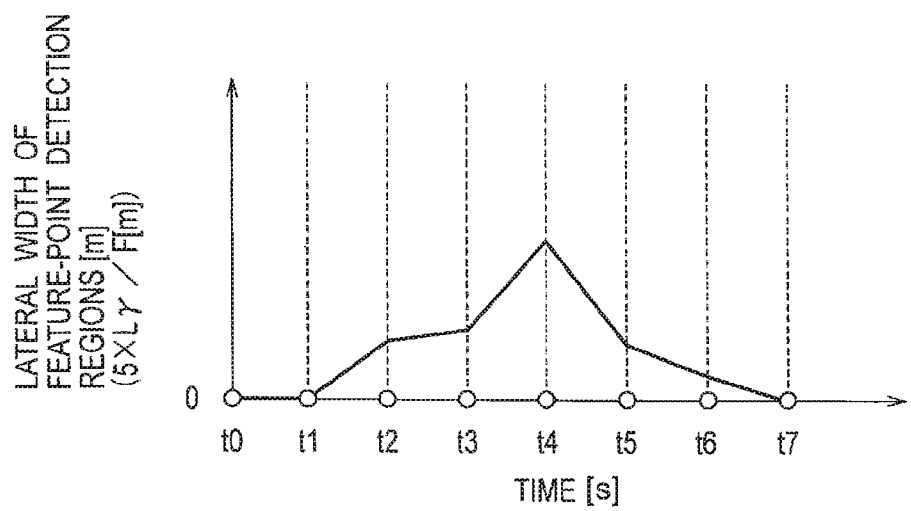
FIG. 19(b) is a graph showing a lateral width of the feature-point detection regions.

FIG. 19(a) shows temporal changes in the absolute value of the yaw rate y. FIG. 19(b) shows temporal changes in the lateral width (5×Lγ/F) of the feature-point detection regions. Times t0 to t7 represent times at which the corresponding information process cycles are performed. As shown in FIGS. 19(a) and 19(b), the lateral width (5×Lγ/F) of the feature-point detection regions may be increased or decreased in proportion to an increase or decrease in the absolute value of the yaw rate γ. Otherwise, the configuration may be made such that: one, two or more threshold values are provided for the yaw rate γ in advance; and the lateral width (5×Lγ/F) of the feature-point detection regions is increased or decreased stepwise each time the yaw rate γ becomes equal to or greater than the threshold values.

[Information Process Cycle]

Next, referring to FIG. 20, descriptions will be provided for details of step S07 of a self-position calculating method of the second embodiment. The other steps of the self-position calculating method of the second embodiment are substantially the same as those of the self-position calculating method of the first embodiment. For this reason, duplicated descriptions will be omitted.

In step S101, the vehicle behavior detector 14 detects the behavior (the yaw rate γ, in the case) of the vehicle 10. In step S102, the feature point detector 23 reads from the memory the image 38, which is obtained with the camera 12, of the image capturing area 30 corresponding to FIG. 8 and as well as sets the feature-point detection region 40c in a way to surround the patterned light beam regions 40b. In this event, depending on the yaw rate γ of the vehicle 10, the feature point detector 23 makes the lateral width w1 of the feature-point detection region 40c wider in a way that the value of the lateral width w1 becomes equal to (5×Lγ/F). In step S103, the feature point detector 23 detects the feature points Te on the road surface 31 from the inside of the feature-point detection region 40c on the image 38, and stores the positions (Ui, Vi) of the feature points Te on the image into the memory.

In step S104, as in the case of the first embodiment, the orientation change amount calculator 24 calculates the distance and orientation angle by use of: the relative positions (Xi, Yi, Zi) of the feature points Te which can be associated between the previous and current information process cycles; and the positions (Ui, Vi) of the thus-associated feature points Te on the previous and current images. In addition, the orientation change amount calculator 24 calculates the amount of movement of the vehicle from the relative positions (Xi, Yi, Zi) of the feature points Te in the previous information process cycle and the relative positions (Xi, Yi, Zi) of the feature points Te in the current information process cycle, as well as stores the amount of movement into the memory.

[First Modification]

Figure 21A:
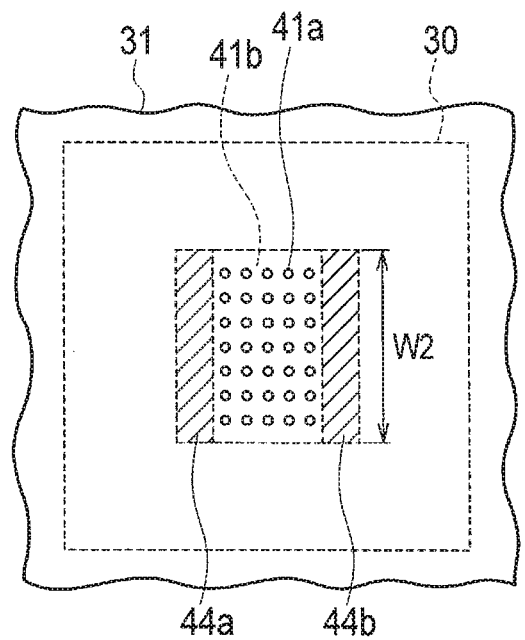
FIG. 21(a) is a schematic diagram showing an example of feature-point detection regions as set when a vehicle speed is relatively low.
Figure 21B:
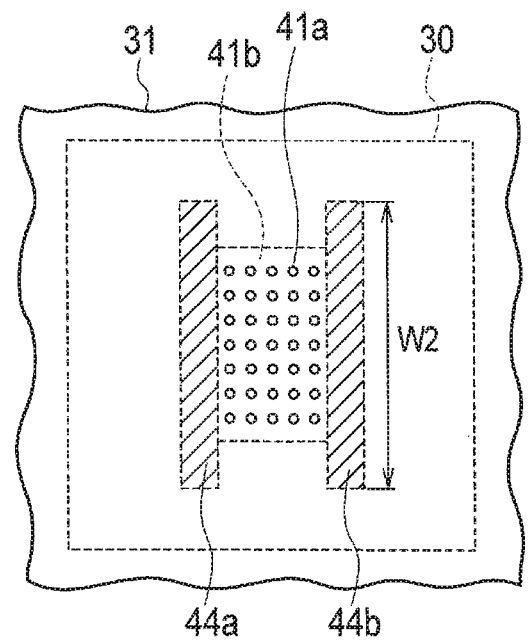
FIG. 21(b) is a schematic diagram showing an example of the feature-point detection regions as set when the vehicle speed is relatively high.

Next, as a first modification, another example of the feature-point detection region setting method will be described. The feature point detector 23 may be configured to change a width of the feature-point detection region(s) in a vehicle front-rear direction depending on the absolute value of a vehicle speed V detected by the vehicle behavior detector 14. For example, when the absolute value of the vehicle speed V detected by the vehicle behavior detector 14 is relatively small, the feature point detector 23 sets a front-rear direction width w2 of the feature-point detection regions 44a, 44b relative narrow, as shown in FIG. 21(a). On the other hand, when the absolute value of the vehicle speed V detected by the vehicle behavior detector 14 is relatively large, the feature point detector 23 sets the front-rear direction width w2 of the feature-point detection regions 44a, 44b relative wider, as shown in FIG. 21(b).

Let us take a specific case, for example, where the frame rate of the camera 12 is F [fps]. In this case, if the vehicle 10 runs at a speed V [m/s], an amount of movement of the feature points Te on the image in the vehicle front-rear direction per frame is V/F [m]. In principal, the detection of the feature points Te while associating the feature points Te between the previous and current frames requires the regions with the front-rear direction width which is equal to or greater than V/F. In this embodiment, with a margin, a front-rear direction width which is five times the amount of movement per frame (5×V/F) is set as the front-rear direction width w2 of the feature-point detection regions 44a, 44b.

Figure 22A:
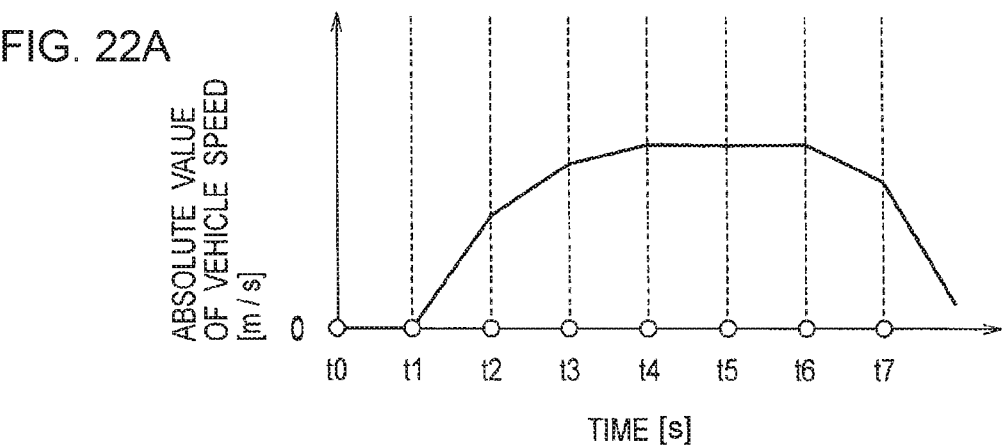
FIG. 22(a) is a graph showing temporal changes in the absolute value of the vehicle speed.
Figure 22B:
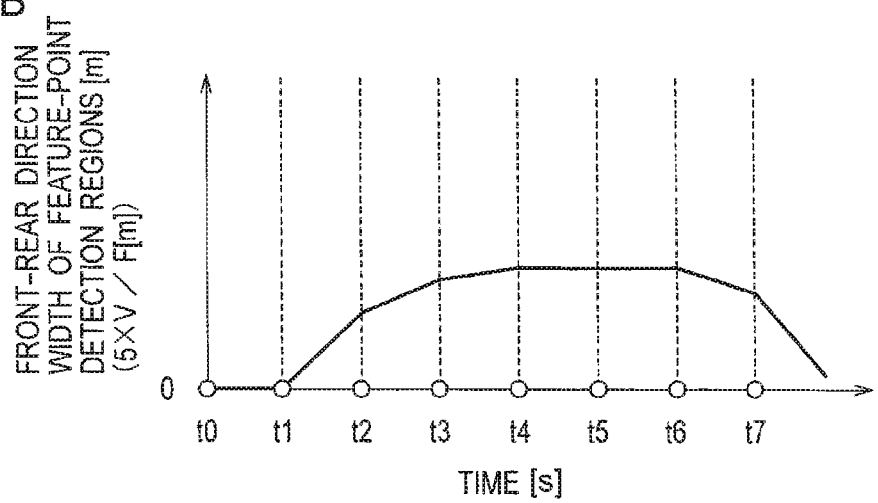
FIG. 22(b) is a graph showing temporal changes in a front-rear direction width of the feature-point detection regions.

FIG. 22(a) shows a temporal change in the absolute value of the vehicle speed V. FIG. 22(b) shows a temporal change in the front-rear direction width (5×V/F) of the feature-point detection regions. Times t1 to t7 represent times at which the corresponding information process cycles are performed. As shown in FIGS. 22(a) and 22(b), the front-rear direction width (5×V/F) of the feature-point detection regions 44a, 44b is increased or decreased according to an increase or decrease in the absolute value of the vehicle speed V. Otherwise, the configuration may be made such that: one, two or more threshold values are provided for the vehicle speed V in advance; and the front-rear direction width (5×V/F) of the feature-point detection regions is increased or decreased stepwise when the vehicle speed V becomes equal to or greater than each of the threshold values.

[Second Modification]

Figure 23A:
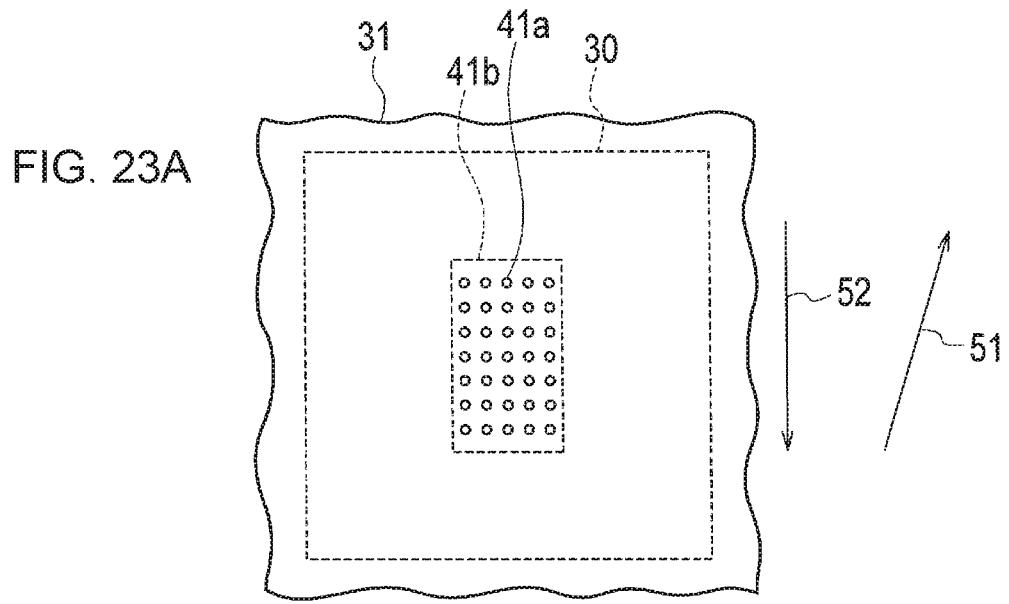
FIG. 23(a) is a schematic diagram showing an example of a patterned light beam region of spotlights densely projected.
Figure 23B:
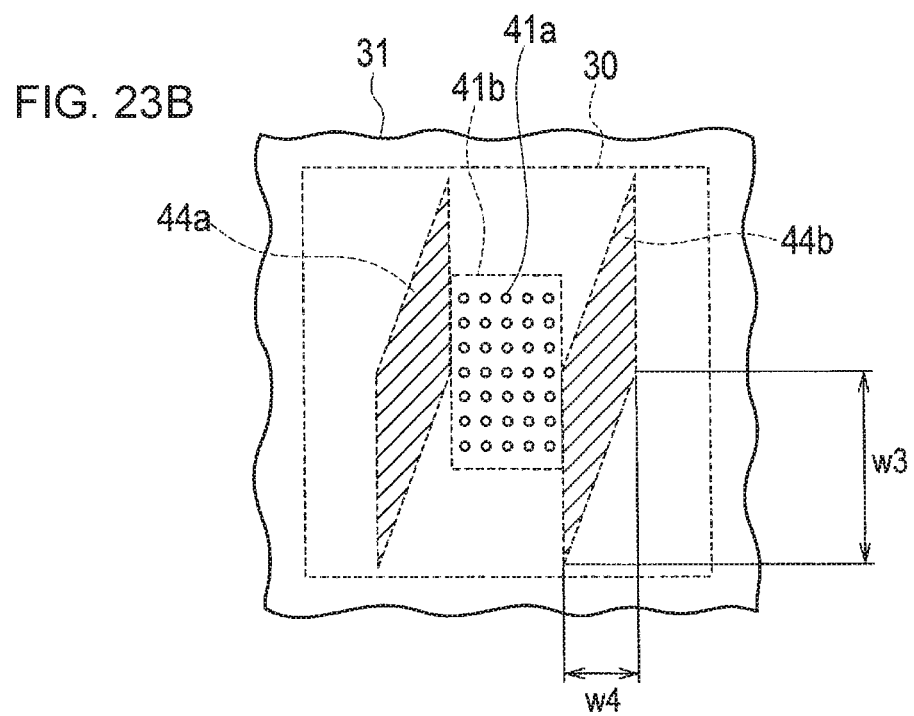
FIG. 23(b) is a schematic diagram showing an example of the feature-point detection regions as set depending on a vehicle speed and a lateral-direction speed.

Next, as a second modification, another example of the feature-point detection region setting method will be described. As shown in FIG. 23(a), the feature point detector 23 may be configured to set a lateral width w4 and a front-rear direction width w3 of the feature-point detection regions 44a, 44b depending on the lateral-direction speed γ and the vehicle speed V in the case where the spotlights as the patterned light beams 41a are projected densely. For example, in a case where the movement direction 51 of the vehicle 10 is directed to the diagonally forward right, the feature point detector 23 widens the lateral width [[w3]]w4 of the feature-point detection regions 44a, 44b up to (5×Lγ/F), and widens the front-rear direction width [[w4]]w3 of the feature-point detection regions 44a, 44b up to (5×V/F), as shown in FIG. 23(b).

[Effects of Second Embodiment]

The self-position calculating apparatus of the second embodiment sets the feature-point detection regions 44a, 44b beside the patterned light beam region 41b including the patterned light beams 41a, and the feature point detection is performed within the feature-point detection regions 44a, 44b. Thereby, the self-position calculating apparatus is capable of accurately detecting the feature points while distinguishing the feature points from the patterned light beams 41a, and accordingly of accurately detecting the self-position of the vehicle.

In addition, the self-position calculating apparatus thereof sets the feature-point detection regions 44a, 44b on the left and right (in the vehicle-width direction) of the patterned light beam region 41b including the patterned light beams 41a, and the feature point detection is performed within the feature-point detection regions 44a, 44b. Thereby, the self-position calculating apparatus is capable of detecting the feature points which are easily associated between the previous and current frames.

Furthermore, the self-position calculating apparatus thereof widens the lateral width w1 of the feature-point detection regions 44a, 44b depending on the lateral-direction speed detected by the vehicle behavior detector 14. Thereby, the self-position calculating apparatus is capable of efficiently detecting the feature points which can be associated between the previous and current frames no matter how the vehicle 10 moves.

Moreover, the self-position calculating apparatus thereof widens the front-rear direction width w2 of the feature-point detection regions 44a, 44b depending on the vehicle speed V detected by the vehicle behavior detector 14. Thereby, the self-position calculating apparatus is capable of efficiently detecting the feature points which can be associated between the previous and current frames no matter how the vehicle 10 moves.

(Other Embodiments)

Although the contents of the present invention have been described based on the first and second embodiments, the present invention is not limited to what has been described above. It is obvious to those skilled in the art that the present invention can be variously modified and improved.

REFERENCE SIGNS LIST 10 vehicle
11 light projector
12 camera (image capturing unit)
13 ECU
14 vehicle behavior detector
21 patterned light beam extractor
22 orientation angle calculator
23 feature point detector
24 orientation change amount calculator
25 self-position calculator
26 patterned light beam controller
30 image capturing area
31 road surface
32a, 32b, 40a, 41a, 42a patterned light beam
40b, 41b, 42b patterned light beam region
40c, 41c, 43a, 43b, 43c, 43d, 44a, 44b feature-point detection region
Te feature point

The invention claimed is:

1. A self-position calculating apparatus comprising:
a laser pointer and a diffraction grating configured to project a patterned light beam onto a road surface around a vehicle;
an camera installed in the vehicle, and configured to capture and obtain an image of the road surface around the vehicle covering an area of the projected patterned light beam;
an orientation angle calculation processor configured to calculate an orientation angle of the vehicle relative to the road surface from a position of the patterned light beam on the image obtained by the camera;
a feature point detection processor configured to set a feature-point detection region surrounding the area of the projected patterned light beam on the image obtained by the camera, and to detect a plurality of feature points on the road surface within the feature-point detection region;
an orientation change amount calculation processor configured to calculate an amount of change in the orientation of the vehicle based on temporal changes in the plurality of feature points on the road surface; and
a self-position calculation processor configured to calculate a current position and a current orientation angle of the vehicle by adding the amount of change in the orientation to an initial position and an initial orientation angle of the vehicle relative to the road surface.

2. The self-position calculating apparatus according to claim 1, wherein
the patterned light beam includes a plurality of spotlights, and
the feature point detection processor sets a feature-point detection region surrounding areas of the projected spotlights.

3. The self-position calculating apparatus according to claim 1, wherein the feature point detection processor sets the feature-point detection region next to the area of the projected patterned light beam in a vehicle-width direction.

4. The self-position calculating apparatus according to claim 1, wherein the feature point detection processor widens the feature-point detection region in the vehicle-width direction, depending on a lateral-direction speed of the vehicle.

5. The self-position calculating apparatus according to claim 1, wherein the feature point detection processor widens the feature-point detection region in a vehicle front-rear direction, depending on a vehicle speed.

6. A self-position calculating method comprising the steps of:
causing a laser pointer and a diffraction grating installed in a vehicle to project a patterned light beam onto a road surface around the vehicle;
causing an camera installed in the vehicle to capture and obtain an image of the road surface around the vehicle covering an area of the projected patterned light beam;
causing a controller of the vehicle to calculate an orientation angle of the vehicle relative to the road surface from a position of the patterned light beam on the obtained image;
causing the controller to set a feature-point detection region surrounding the area onto which the patterned light beam is projected on the obtained image, and to detect a plurality of feature points on the road surface within the feature-point detection region;
causing the controller to calculate an amount of change in the orientation of the vehicle based on temporal changes in the plurality of feature points on the road surface; and causing the controller to calculate a current position and a current orientation angle of the vehicle by adding the amount of change in the orientation to an initial position and an initial orientation angle of the vehicle relative to the road surface.

* * * * *